US012658788B2

(12) United States Patent (10) Patent No.: US 12,658,788 B2
Yamada (45) Date of Patent: Jun. 16, 2026

(54) SWITCHING CONTROL CIRCUIT AND POWER SUPPLY CIRCUIT

(71) Applicant: FUJI ELECTRIC CO., LTD., Kawasaki (JP)

(72) Inventor: Ryuji Yamada, Hachioji-city (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 246 days.

(21) Appl. No.: 18/422,853

(22) Filed: Jan. 25, 2024

(65) Prior Publication Data

US 2024/0333132 A1 Oct. 3, 2024

(30) Foreign Application Priority Data

Mar. 29, 2023 (JP) ................................. 2023-053365

(51) Int. Cl.
H02M 1/42 (2007.01)
H02M 1/00 (2006.01)
H02M 3/158 (2006.01)

(52) U.S. Cl.
CPC ....... H02M 1/4225 (2013.01); H02M 1/0025 (2021.05); H02M 1/0032 (2021.05); H02M 3/1586 (2021.05)

(58) Field of Classification Search
CPC ............. H02M 3/1586; H02M 1/4225; H02M 1/0032; H02M 1/0025
See application file for complete search history.

(56) References Cited

U.S. PATENT DOCUMENTS

| | | | |
|---|---|---|---|
| 10,128,744 B1* | 11/2018 | Viswanathan | ...... H02M 1/4225 |
| 2014/0160815 A1* | 6/2014 | Jeong | .................. H02M 1/4225 |
| | | | 323/210 |
| 2018/0358807 A1 | 12/2018 | Yamada | |
| 2021/0367517 A1* | 11/2021 | Lawrence | ........... H02M 3/1586 |
| 2022/0069714 A1 | 3/2022 | Beltran et al. | |
| 2023/0092655 A1* | 3/2023 | Cai | ..................... H02M 3/1586 |
| | | | 323/271 |

FOREIGN PATENT DOCUMENTS

| | | |
|---|---|---|
| JP | 2018-207732 A | 12/2018 |
| JP | 2020-127287 A | 8/2020 |
| JP | 2022-041912 A | 3/2022 |

* cited by examiner

*Primary Examiner* — Alex Torres-Rivera
(74) *Attorney, Agent, or Firm* — Rabin & Berdo, P.C

(57) ABSTRACT

A switching control circuit including: a command value output circuit that respectively outputs a command value indicating a first time period, and command values indicating second and third time periods, in first and second load states; a first driver circuit that, in the first load state, turns on a first transistor after a first inductor current reaches a first value, and subsequently turns off the first transistor when the first time period has elapsed; and a second driver circuit that, in the second load state, turns on a second transistor when a second inductor current reaches a second value, and subsequently turns off the second transistor when the third time period has elapsed. The first driver circuit, in the second load state, turns on the first transistor when the first inductor current reaches the first value, and subsequently turns off the first transistor when the second time period has elapsed.

9 Claims, 23 Drawing Sheets

| STATE OF LOAD 11 | LIGHT LOAD | HEAVY LOAD |
|---|---|---|
| $\alpha a$ | 1.0 | 0.5 |
| $\alpha b$ | 0 | 0.5 |
| $Vx$ | 100 | 100 |
| $Vy$ | 100 | 50 |
| $Vz$ | 0 | 50 |

FIG. 4

SWITCHING CONTROL CIRCUIT AND POWER SUPPLY CIRCUIT

CROSS-REFERENCE TO RELATED APPLICATIONS

The present application claims priority pursuant to 35 U.S.C. § 119 from Japanese patent application number 2023-053365 filed on Mar. 29, 2023, the entire disclosure of which is hereby incorporated by reference herein.

BACKGROUND

Technical Field

The present disclosure relates to a switching control circuit and a power supply circuit.

Description of the Related Art

A typical power factor correction circuit (hereinafter, referred to as power factor correction (PFC) circuit) configured to operate in a critical mode improves a power factor by shaping a waveform of peak values of an inductor current flowing through an inductor into a waveform similar to that of a rectified voltage obtained by rectifying an alternating current (AC) voltage. In this case, for example, a plurality of boost chopper circuits (e.g., two systems) may be configured as one PFC circuit, to thereby perform a parallel operation (for Japanese example, patent application publications Nos. 2022-041912, 2018-207732, 2020-127287).

In a PFC circuit that performs an interleaved operation, there are cases where when the load is in a light load state, only the boost chopper circuit of one system is operated, and when the load enters a heavy load state, the boost chopper circuits of two systems are operated in parallel.

However, in operating the boost chopper circuits of two systems in parallel, when the boost chopper circuit having been stopped is started to operate in the same state as in the chopper circuit having been already operating, the output current to the load may increase, so that an output voltage may rise.

Such a rise in the voltage is suppressed by modifying the operating state so that the voltage will reach a desired value under the condition that the two systems are operating with a voltage control system. However, until a steady state is brought about, the amplitude of the input current increases and decreases, which may cause a disturbance of the input current.

SUMMARY

A first aspect of the present disclosure is a switching control circuit for a power supply circuit that generates an output voltage at a target level from an alternating current (AC) voltage inputted thereto, the power supply circuit including a first inductor and a second inductor, the first and second inductors being configured to receive a voltage corresponding to the AC voltage, a first transistor configured to control a first inductor current flowing through the first inductor, and a second transistor configured to control a second inductor current flowing through the second inductor, the switching control circuit being configured to control switching of the first transistor and the second transistor, the switching control circuit comprising: a command value output circuit configured to, when a current value of a load current flowing through a load of the power supply circuit is smaller than a first predetermined value and the load is in a first state, output a first command value indicating a first time period corresponding to the output voltage, and when the current value of the load current is larger than a second predetermined value and the load is in a second state, output a second command value indicating a second time period corresponding to the output voltage, and a third command value indicating a third time period; a first driver circuit configured to, when the load is in the first state, receive the first command value, turn on the first transistor, after the first inductor current reaches a first value, and turn off the first transistor, in response to the first time period based on the first command value having elapsed since the first transistor is turned on; and a second driver circuit configured to, when the load is in the second state, receive the third command value, turn on the second transistor, in response to the second inductor current reaching a second value, and turn off the second transistor, in response to the third time period based on the third command value having elapsed since the second transistor is turned on, wherein the first driver circuit is further configured to, when the load is in the second state, receive the second command value, turn on the first transistor, in response to the first inductor current reaching the first value, and turn off the first transistor, in response to the second time period based on the second command value having elapsed since the first transistor is turned on.

A second aspect of the present disclosure is a switching control circuit for a power supply circuit that generates an output voltage at a target level from an alternating current (AC) voltage inputted thereto, the power supply circuit including a first inductor and a plurality of second inductors, each of the first and second inductors being configured to receive a voltage corresponding to the AC voltage, and a first transistor and a plurality of second transistors configured to respectively control first and a plurality of inductor currents flowing through the first inductor and the plurality of second inductors, the switching control circuit being configured to control switching of the first and second transistors, the switching control circuit comprising: a command value output circuit configured to, when a current value of a load current flowing through a load of the power supply circuit is smaller than a first predetermined value and the load is in a first state, output a first command value indicating a first time period corresponding to the output voltage, and when the current value of the load current is larger than a second predetermined value and the load is in a second state, output a second command value indicating a second time period corresponding to the output voltage and a third command value indicating a third time period; a first driver circuit configured to, when the load is in the first state, receive the first command value, turn on the first transistor in response to the first inductor current reaching a first value, and turn off the first transistor, in response to the first time period based on the first command value having elapsed since the first transistor is turned on, and a second driver circuit configured to, when the load is in the second state, receive the third command value, turn on the plurality of second transistors, after each of the plurality of inductor currents reaching a second value, and turn off the plurality of second transistors, in response to the third time period based on the third command value having elapsed since the plurality of second transistors are turned on, wherein the first driver circuit is further configured to, when the load is in the second state, receive the second command value, turn on the first transistor, in response to the first inductor current reaching the first value, and turn off the first transistor, in response to the second time period based on the second command value having elapsed since the first transistor is turned on.

A third aspect of the present disclosure is a power supply circuit configured to generate an output voltage at a target level from an alternating current (AC) voltage inputted thereto, the power supply circuit comprising: a first inductor and a second conductor, the first and second inductors being configured to receive a voltage corresponding to the AC voltage; a first transistor configured to control a first inductor current flowing through the first inductor; a second transistor configured to control a second inductor current flowing through the second inductor; a switching control circuit configured to control switching of the first transistor and the second transistor, the switching control circuit including a command value output circuit configured to, when a current value of a load current flowing through a load of the power supply circuit is smaller than a first predetermined value and the load is in a first state, output a first command value indicating a first time period corresponding to the output voltage, and when the current value of the load current is larger than a second predetermined value and the load is in a second state, output a second command value indicating a second time period corresponding to the output voltage, and a third command value indicating a third time period; a first driver circuit configured to, when the load is in the first state, receive the first command value, turn on the first transistor, in response to the first inductor current reaching a first value, and turn off the first transistor, in response to the first time period based on the first command value having elapse since the first transistor is turned on; and a second driver circuit configured to, when the load is in the second state, receive the third command value, turn on the second transistor, after the second inductor current reaches a second value, and turn off the second transistor, in response to the third time period based on the third command value having elapsed since the second transistor is turned on, wherein the first driver circuit is further configured to, when the load is in the second state, receive the second command value, turn on the first transistor, in response to the first inductor current reaching the first value, and turn off the first transistor, in response to the second time period based on the second command value having elapsed since the first transistor is turned on.

BRIEF DESCRIPTION OF THE DRAWINGS

FIG. 3 is a diagram illustrating an example of a switching control circuit 43a.

FIG. 4 is a table illustrating changes in ON periods Vx, Vy, and Vz in association with changes in the state of a load 11.

FIG. 5 is a diagram illustrating main waveforms of a switching control circuit 43a.

FIG. 7 is a diagram illustrating main waveforms of a switching control circuit 43a.

FIG. 8 is a diagram illustrating main waveforms of a switching control circuit 43a.

DETAILED DESCRIPTION

Figure 1:
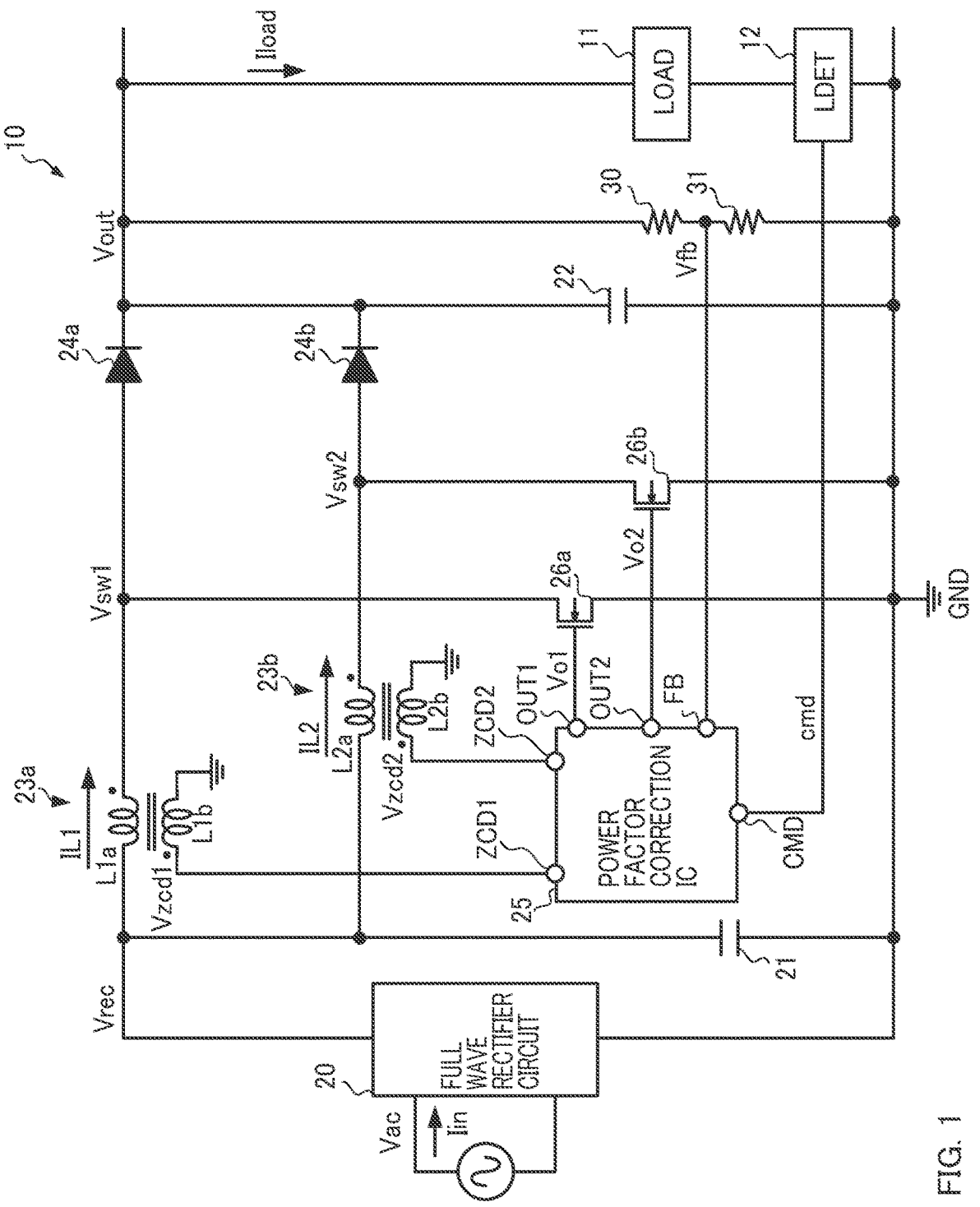
FIG. 1 is a diagram illustrating an example of an AC-DC converter 10.

At least following matters will become apparent from descriptions of the present description and the accompanying drawings. It is assumed, hereinafter, that a "circuit" according to an embodiment of the present disclosure includes not only an analog circuit and a logic circuit of a wired logic type, but also a functional block (or means) that is included in a digital signal processor (DSP), a microcomputer, or the like, and that is capable of executing digital arithmetic processing.

Hereinafter, embodiments of the present disclosure will be described with reference to the drawings. The same or equivalent constituent elements, members, and the like illustrated in the drawings are given the same reference numerals, and repetitive description is omitted as appropriate.

EMBODIMENTS

<<<Overview of AC-DC Converter 10>>>

FIG. 1 is a diagram illustrating a configuration of an AC-DC converter 10 which is an embodiment of the present disclosure. The AC-DC converter 10 is a boost power factor correction (PFC) circuit to generate an output voltage Vout at a target level from an alternating-current (AC) voltage Vac of a commercial power supply.

The AC-DC converter 10 includes a full-wave rectifier circuit 20, capacitors 21, 22, transformers 23a, 23b, diodes 24a, 24b, a power factor correction IC 25, NMOS transistors 26a, 26b, and resistors 30, 31. Note that the AC-DC converter 10 corresponds to a "power supply circuit".

The full-wave rectifier circuit 20 full-wave rectifies the predetermined AC voltage Vac inputted thereto, and outputs a resultant voltage as an input voltage Vrec to a capacitor 21, a main coil L1a (described later) of a transformer 23a, and a main coil L2a (described later) of a transformer 23b. Note that the AC voltage Vac is a voltage with an effective value in a range of 100 to 240 V and a frequency in a range of 50 to 60 Hz, for example. Hereinafter, in an embodiment of the present disclosure, voltages basically refer to a difference in potential relative to a reference point (GND in FIG. 1), however, the AC voltage Vac refers to a voltage between terminals.

The capacitor 21 smooths the input voltage Vrec, and the capacitor 22 is an element to be charged with the output voltages of two boost chopper circuits. The main coil L1a of the transformer 23a, the diode 24a, and the NMOS transistor 26a configure a first boost chopper circuit together with the capacitor 22. Further, the main coil L2a of the transformer 23b, the diode 24b, and the NMOS transistor 26b configure a second boost chopper circuit together with the capacitor 22. Thus, the charge voltage of the capacitor 22 results in the direct current (DC) output voltage Vout.

The transformer 23a includes the main coil L1a and an auxiliary coil L1b magnetically coupled to the main coil L1a. Note that the auxiliary coil L1b according to an embodiment of the present disclosure is formed by winding a wire such that the voltage generated at the auxiliary coil L1b has a polarity opposite to that of the voltage generated at the main coil L1a. Then, a voltage Vzcd1 generated at the auxiliary coil L1b is applied to a terminal ZCD1 of the power factor correction IC 25. Further, it is assumed that when the inductor current IL1 flows through the main coil L1a in the direction of an arrow, the direction in which the inductor current IL1 flows is a positive direction, and when the inductor current IL1 flows therethrough in a direction opposite to the direction of the arrow, the direction in which the inductor current IL1 flows is a negative direction. Further, when the current value of the inductor current IL1 reaches substantially zero, the voltage value of the voltage Vzcd1 reaches a first predetermined voltage value. Note that the main coil L1a corresponds to a "first inductor".

Similarly, the transformer 23b includes the main coil L2a and an auxiliary coil L2b magnetically coupled to the main coil L2a. Note that the auxiliary coil L2b according to an embodiment of the present disclosure is formed by winding a wire such that the voltage generated at the auxiliary coil L2b has a polarity opposite to that of the voltage generated at the main coil L2a. Then, a voltage Vzcd2 generated at the auxiliary coil L2b is applied to a terminal ZCD2 of the power factor correction IC 25. Further, it is assumed that when the inductor current IL2 flows through the main coil L2a in the direction of an arrow, the direction in which the inductor current IL2 flows is a positive direction, and when the inductor current IL2 flows in the direction opposite to the direction of the arrow, the direction in which the inductor current IL2 flows is a negative direction. Further, when the current value of the inductor current IL2 reaches substantially zero, the voltage value of the voltage Vzcd2 reaches a second predetermined voltage value. Note that the main coil L2a corresponds to a "second inductor".

The power factor correction IC 25 is an integrated circuit to control switching of the NMOS transistors 26a, 26b such that the level of the output voltage Vout reaches a target level (e.g., 400 V) while improving the input power factor of the AC-DC converter 10. Specifically, the power factor correction IC 25 drives the NMOS transistor 26a, based on the inductor current IL1 flowing through the main coil L1a and the output voltage Vout. Note that the inductor current IL1 corresponds to a "first inductor current".

Further, the power factor correction IC 25 drives the NMOS transistor 26b, based on the inductor current IL2 flowing through the main coil L2a and the ON period of the NMOS transistor 26a. The power factor correction IC 25 has terminals ZCD1, ZCD2, FB, OUT1, OUT2, and CMD, and the details of the power factor correction IC 25 will be described later. Note that, in an embodiment of the present disclosure, other terminals (e.g., a ground terminal) other than the terminal ZCD1 and the like of the power factor correction IC 25 are omitted for convenience. Further, the inductor current IL2 corresponds to a "second inductor current".

The NMOS transistors 26a, 26b are power transistors to control power to a load 11 of the AC-DC converter 10. Note that in an embodiment of the present disclosure, the NMOS transistors 26a, 26b are n-type metal oxide semiconductor (NMOS) transistors, but they are not limited thereto, and may be other switching elements such as bipolar transistors or the like, for example. Further, the gate electrode of the NMOS transistor 26a is coupled to the terminal OUT1, and the gate electrode of the NMOS transistor 26b is coupled to the terminal OUT2. Note that the NMOS transistor 26a corresponds to a "first transistor", and the NMOS transistor 26b corresponds to a "second transistor".

The resistors 30, 31 configure a voltage divider circuit to divide the output voltage Vout, to thereby generate a feedback voltage Vfb that is used in switching the NMOS transistors 26a, 26b. Note that the feedback voltage Vfb generated at the node at which the resistors 30 and 31 are coupled is applied to the terminal FB.

A load detection circuit (LDET) 12 detects the state of the load 11, and outputs a signal cmd of a low level (hereinafter, low or low level) when the load 11 is in a light load state (i.e., "first state"), based on a load current Iload flowing through the load 11. Meanwhile, the load detection circuit 12 outputs a signal cmd at a high level (hereinafter, referred to as high or high level) when the load 11 is in a heavy load state (i.e., "second state").

Note that in an embodiment of the present disclosure, the "light load" indicates, for example, that the current value of the load current Iload flowing through the load 11 is smaller than a first predetermined value, and the "heavy load" indicates that the current value of the load current Iload flowing through the load 11 is larger a second predetermined value. Further, the first predetermined value and the second predetermined value may be the same or different, for example, both the first predetermined value and the second predetermined value may be, for example, 5A, or the first predetermined value may be, for example, 1A and the second predetermined value may be, for example, 5A. Further, the phrase "the load 11 is in the light load state" refers to the case in which the state of the load 11 is smaller than a "first load", and "the load 11 is in the heavy load state" refers to the case in which the state of the load 11 is greater than a "second load". Further, the "first load" corresponds to the light load, and the "second load" corresponds to the heavy load. Furthermore, the load detection circuit 12 corresponds to a "first load detection circuit".

<<<Power Factor Correction IC 25>>>

==Configuration of Power Factor Correction IC 25==

Figure 2:
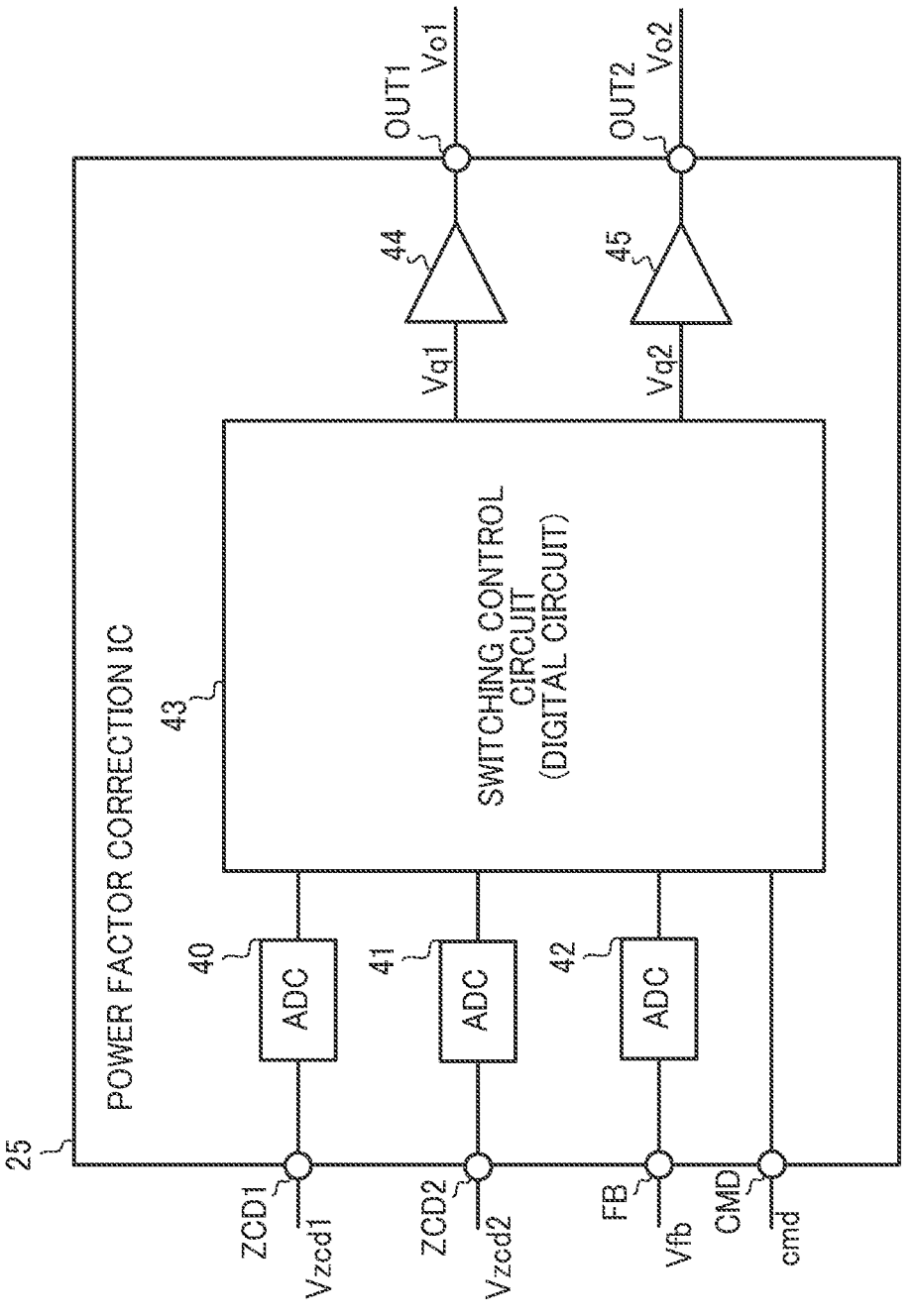
FIG. 2 is a diagram illustrating an example of a power factor correction IC 25.

FIG. 2 is a diagram illustrating an example of the power factor correction IC 25. The power factor correction IC 25 includes analog-to-digital converters (ADCs: AD converters) 40 to 42, a switching control circuit 43, and buffer circuits 44, 45. Note that the switching control circuit 43 includes a digital circuit.

The AD converter 40 converts the voltage Vzcd1 into a digital value, the AD converter 41 converts the voltage Vzcd2 into a digital value, and the AD converter 42 converts the feedback voltage Vfb into a digital value.

The switching control circuit 43 outputs driving signals Vq1, Vq2 to drive the NMOS transistors 26a, 26b, based on the feedback voltage Vfb and the voltages Vzcd1 and Vzcd2 respectively corresponding to the inductor currents IL1 and IL2. The switching control circuit 43 is a digital circuit configured with a logic circuit of a wired logic type to execute various arithmetic calculations, and includes, for example, a logic gate, a flip-flop, and a memory. However, the switching control circuit 43 may be a digital signal processor (DSP) or a microcomputer. Note that details of the switching control circuit 43 will be described later.

The buffer circuit 44 is a driver circuit to drive the NMOS transistor 26a in response to the driving signal Vq1. Specifically, the buffer circuit 44 turns on the NMOS transistor 26a, in response to the driving signal Vq1 going high, and turns off the NMOS transistor 26a, in response to the driving signal Vq1 going low.

Similarly, the buffer circuit 45 is a driver circuit to drive the NMOS transistor 26b, in response to the driving signal Vq2. Specifically, the buffer circuit 45 turns on the NMOS transistor 26b, in response to the driving signal Vq2 going high, and turns off the NMOS transistor 26b, in response to the driving signal Vq2 going low.

==Configuration of Switching Control Circuit 43a==

Figure 3:
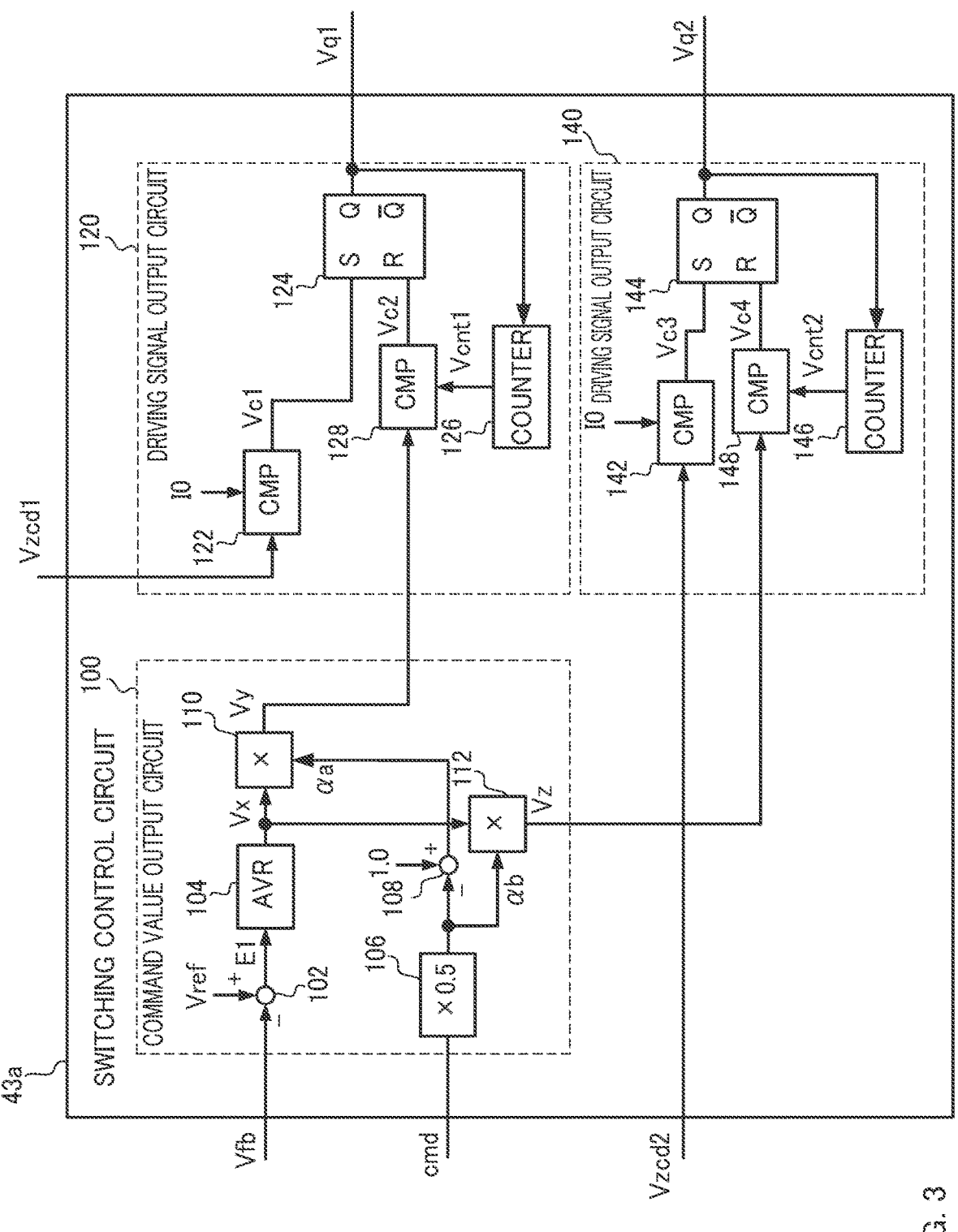

FIG. 3 illustrates an example of a switching control circuit 43a which is an embodiment of the switching control circuit 43.

The switching control circuit 43a outputs the driving signals Vq1, Vq2, based on the inductor currents IL1, IL2, the feedback voltage Vfb, and the signal cmd. Specifically, when the load 11 is in the light load state; the inductor current IL1 decreases to substantially zero; and the voltage value of the voltage Vzcd1 corresponding to the inductor current IL1 reaches the first predetermined voltage, the switching control circuit 43a outputs the driving signal Vq1 to turn on the NMOS transistor 26a.

Then, after a lapse of an ON period Vy that is ON period Vx based on the feedback voltage Vfb, the switching control circuit 43a outputs the driving signal Vq1 to turn off the NMOS transistor 26a. Note that when the load 11 is in the light load state, the switching control circuit 43a outputs the driving signal Vq2 to turn off the NMOS transistor 26b.

Meanwhile, when the load 11 is in the heavy load state; the inductor current IL1 decreases to substantially zero; and the voltage value of the voltage Vzcd1 corresponding to the inductor current IL1 reaches the first predetermined voltage value, the switching control circuit 43a outputs the driving signal Vq1 to turn on the NMOS transistor 26a. Further, when the load 11 is in the heavy load state; the inductor current IL2 decreases to substantially zero; and the voltage value of the voltage Vzcd2 corresponding to the inductor current IL2 reaches the second predetermined voltage value, the switching control circuit 43a outputs the driving signal Vq2 to turn on the NMOS transistor 26b. Then, after a lapse of the ON periods Vy, Vz, obtained by multiplying the ON period Vx by a ratio (e.g., 0.5 in an embodiment of the present disclosure) for the two boost chopper circuits to supply power to the load 11 in a balanced manner, the switching control circuit 43a outputs the driving signals Vq1, Vq2 to turn off the NMOS transistors 26a, 26b, respectively. The switching control circuit 43a includes a command value output circuit 100 and driving signal output circuits 120, 140.

===Command Value Output Circuit 100===

The command value output circuit 100 outputs command values indicating the ON periods Vy, Vz of the NMOS transistors 26a, 26b, based on the signal cmd indicating the state of the load 11 and the feedback voltage Vfb. Specifically, when the load 11 is in the light load state, the command value output circuit 100 outputs the command value indicating the ON period Vy that is equal to the ON period Vx corresponding to the feedback voltage Vfb. Further, when the load 11 is in the light load state, the command value output circuit 100 outputs the command value indicating the ON period Vz of "0" so as to output the driving signal Vq2 to turn off the NMOS transistor 26b.

Meanwhile, when the load 11 is in the heavy load state, the command value output circuit 100 outputs the command values indicating the ON periods Vy, Vz according to the feedback voltage Vfb (i.e., the command values indicating ON periods Vy, Vz obtained by multiplying the ON period Vx by the ratio for the two boost chopper circuits to supply power to the load 11 in a balanced manner). The command value output circuit 100 includes subtractor circuits 102, 108, a voltage regulator circuit 104, a ratio output circuit 106, and multiplier circuits 110, 112. Note that the "command value" includes, for example, a voltage value, a digital value, and the like, and hereinafter, for example, the "command value indicating the ON period Vx" may be referred to as "ON period Vx". The same applies to the command values indicating ON periods Vy, Vz, and the like.

The subtractor circuit 102 subtracts the feedback voltage Vfb from a reference voltage Vref, which is the reference for the output voltage Vout at a target level (e.g., 400 V), to thereby calculate an error E1 between the reference voltage Vref and the feedback voltage Vfb.

The voltage regulator circuit 104 outputs, according to the error E1, the ON period Vx for causing the level of the feedback voltage Vfb to reach the level of the reference voltage Vref. Note the subtractor circuit 102 and the voltage regulator circuit 104 according to an embodiment of the present disclosure correspond to a so-called error amplifier circuit to perform amplification, integration, and the like of the error E1, for example. Further, the ON period Vx corresponds to a "first time period", and the command value indicating the ON period Vx corresponds to a "first command value".

The ratio output circuit 106 outputs a ratio ab of "0", in response to the load 11 being in the light load state and the load detection circuit 12 outputting the low signal cmd. Meanwhile, the ratio output circuit 106 outputs the ratio ab of "0.5", in response to the load 11 being in the heavy load and the load detection circuit 12 outputting the high signal cmd.

The subtractor circuit 108 subtracts the ratio ab from "1.0", to thereby output a resultant as a ratio ca. The multiplier circuit 110 multiplies the ON period Vx by the ratio da, to thereby output a resultant as the ON period Vy. Further, the multiplier circuit 112 multiplies the ON period Vx by the ratio ab, to thereby output a resultant as the ON period Vz.

Accordingly, as illustrated in FIG. 4, assuming that the ON period Vx is "100", when the load 11 is in the light load state, the ratio ab is "0", and thus the ratio da results in "1.0", and the ON period Vy results in "100", which is equal to the ON period Vx. Further, in this case, since the ratio ab is "0", the ON period Vz results in "0". Meanwhile, when the load 11 is in the heavy state, the ratio ab is "0.5", and thus the ratio da results in "0.5", and the ON period Vy results in "50", which is a half of the ON period Vx. Similarly, the ON period Vz is a half of the ON period Vx.

Further, even if the ON period Vx is "100" when the load 11 changes from the light load state to the heavy load state, thereafter, when the power consumed by the load 11 becomes, for example, twice or more and the load current Iload becomes twice or more, the ON period Vx results in "200" or more. In this case, the ON periods Vy, Vz may become longer than the ON period Vx at the time when the load 11 changes from the light load state to the heavy load state. Note that the ON period Vy when the load 11 is in the heavy load state corresponds to a "second time period", the command value indicating the ON period Vy corresponds to a "second command value", the ON period Vz corresponds to a "third time period", and the command value indicating the ON period Vz corresponds to a "third command value".

==Driving Signal Output Circuit 120==

The driving signal output circuit 120 outputs the driving signal Vq1 to drive the NMOS transistor 26a, based on the voltage Vzcd1 corresponding to the inductor current IL1 and the ON period Vy. Specifically, the driving signal output circuit 120 outputs the driving signal Vq1 to turn on the NMOS transistor 26a, in response to the inductor current IL1 reaching substantially zero. Thereafter, the driving signal output circuit 120 outputs the driving signal Vq1 to turn off the NMOS transistor 26a, after a lapse of the ON period Vy. The driving signal output circuit 120 includes the comparator circuits 122, 128, an RS flip-flop circuit 124, and a counter 126.

The comparator circuit 122 detects the timing at which the NMOS transistor 26a is turned on, in response to the current value of the inductor current IL1 reaching a predetermined current value I0 slightly larger than zero (e.g., several mA, i.e., substantially zero (hereinafter, "substantially zero" will be simply referred to as "0" (zero) as appropriate)).

Specifically, in response to the current value of the inductor current IL1 becoming smaller than the current value I0 and the voltage value of the voltage Vzcd1 that indicates the current value of the inductor current IL1 becoming smaller than the first predetermined value that indicates the current value I0, the comparator circuit 122 outputs the high signal Vc1. Meanwhile, in response to the voltage value of the voltage Vzcd1 that indicates the current value of the inductor current IL1 being larger than the first predetermined voltage value, the comparator circuit 122 outputs the low signal Vc1. Note that the current value I0 corresponds to a "first value".

The signal Vc1 is inputted to an input S of the RS flip-flop circuit 124, and a signal Vc2 from the comparator circuit 128 is inputted to an input R thereof. Thus, in response to the signal Vc1 going high, the driving signal Vq1, which is an output Q of the SR flip-flop 124, goes high. Meanwhile, in response to the signal Vc2 going high, the driving signal Vq1 goes low.

The counter 126 is a circuit to output a signal Vont1 to determine the timing at which the NMOS transistor 26a is turned off, and increment a count value from zero in response to a clock signal (not shown) when the driving signal Vq1 goes high. That is, the counter 126 outputs a signal corresponding to the ramp wave in which the value of the signal Vont1 increases in proportion to an elapsed time, when the driving signal Vq1 goes high.

The comparator circuit (CMP) 128 compares the magnitude between the ON period Vy and the signal Vont1. Specifically, the comparator circuit 128 outputs the high signal Vc2 when the signal Vont1 is larger than the ON period Vy, and outputs the low signal Vc2 when the signal Vont1 is smaller than the ON period Vy. Note that the driving signal output circuit 120 and the buffer circuit 44 correspond to a "first driver circuit".

==Driving Signal Output Circuit 140==

The driving signal output circuit 140 outputs the driving signal Vq2 to drive the NMOS transistor 26b, based on the voltage Vzcd2 corresponding to the inductor current IL2 and the ON period Vz. Specifically, the driving signal output circuit 140 outputs the driving signal Vq2 to turn on the NMOS transistor 26b, in response to the inductor current IL2 reaching zero. Thereafter, the driving signal output circuit 140 outputs the driving signal Vq2 to turn off the NMOS transistor 26b, after a lapse of the ON period Vz. The driving signal output circuit 140 includes the comparator circuits 142, 148, an RS flip-flop circuit 144, and a counter 146.

The comparator circuit 142 detects the timing at which the NMOS transistor 26b is turned off, in response to the current value of the inductor current IL2 reaching zero. Specifically, when the current value of the inductor current IL2 becomes smaller than the current value I0, and the voltage value of the voltage Vzcd2 indicating the current value of the inductor current IL2 becomes smaller than the second predetermined voltage value indicating the current value I0, the comparator circuit 142 outputs a high signal Vc3. Meanwhile, when the voltage value of the voltage Vzcd2 indicating the current value of the inductor current IL2 is larger than the second predetermined voltage value, the comparator circuit 142 outputs the low signal Vc3. Note that the current value I0 corresponds to a "second value".

The signal Vc3 is inputted to an input S of the RS flip-flop circuit 144, and a signal Vc4 from the comparator circuit 148 is inputted to an input R thereof. Thus, in response to the signal Vc3 going high, the signal Vq2, which is an output Q of the SR flip-flop 144, goes high. Meanwhile, in response to the signal Vc4 going high, the signal Vq2 goes low.

The counter 146 is a circuit to output a signal Vont2 to determine the timing at which the NMOS transistor 26b is turned off, and increment a count value from zero in response to a clock signal (not shown), when the driving signal Vq2 goes high. That is, the counter 146 outputs a signal corresponding to the ramp wave in which the value of the signal Vont2 increases in proportion to an elapsed time, when the driving signal Vq2 goes high.

The comparator circuit 148 compares the magnitude between the ON period Vz and the signal Vont2. Specifically, the comparator circuit 148 outputs the high signal Vc4 when the signal Vont2 is larger than the ON period Vz, and outputs the low signal Vc4 when the signal Vont2 is smaller than the ON period Vz. Note that the driving signal output circuit 140 and the buffer circuit 45 correspond to a "second driver circuit".

<<<Operation of Switching Control Circuit 43a when Load 11 is in Light Load State>>>

Figure 5:
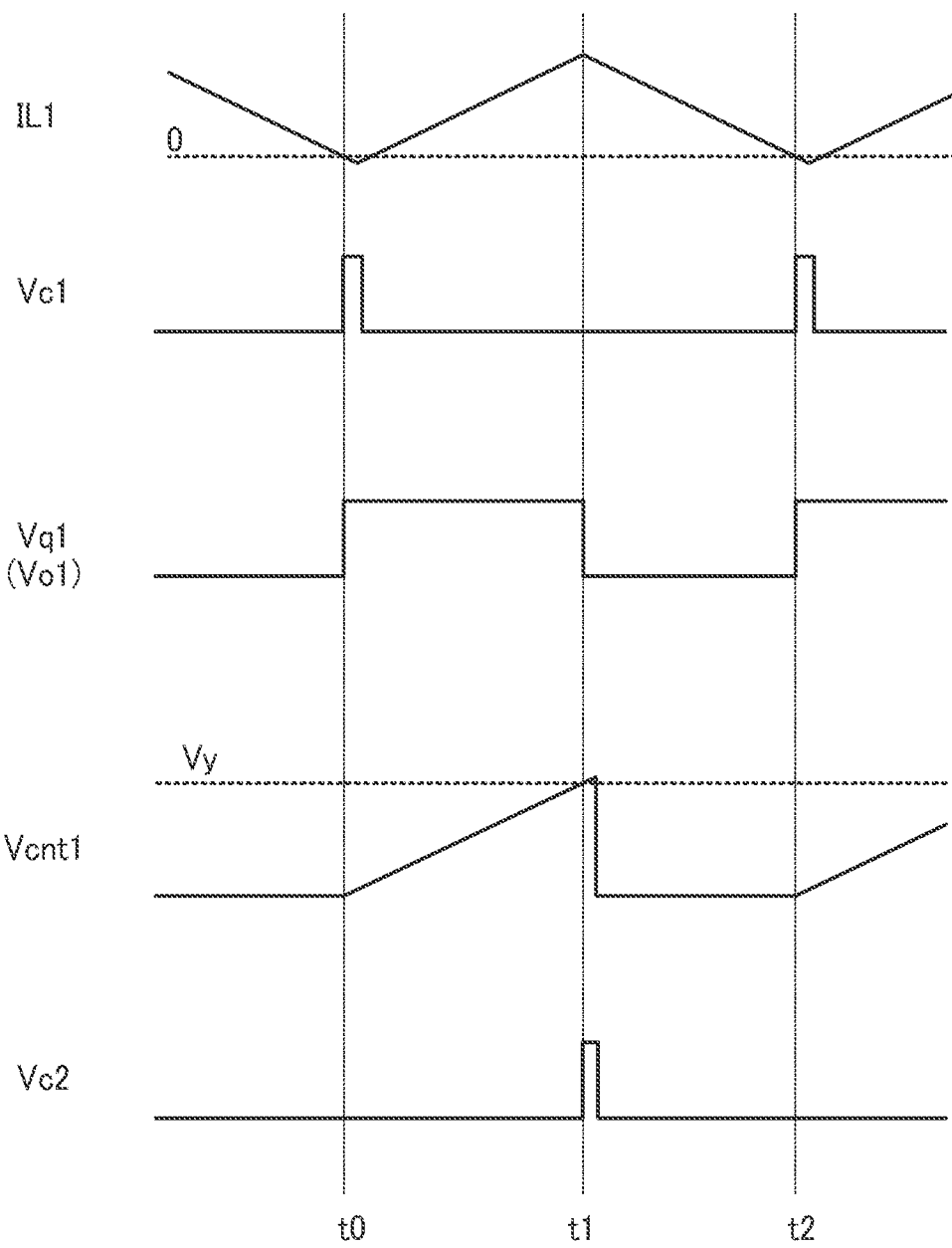

FIG. 5 is a diagram illustrating main waveforms of the switching control circuit 43a when the load 11 is in the light load state. When the load 11 is in the light load state, the command value output circuit 100 outputs the ON period Vy that is the ON period Vx corresponding to the feedback voltage Vfb, and the ON period Vz of "0", and the driving signal output circuit 140 outputs the driving signal Vq2 to turn off the NMOS transistor 26b.

Accordingly, the following describes, with reference to FIG. 5, the operation when the AC-DC converter 10 generates the output voltage Vout at the target level from the predetermined AC voltage Vac, and supplies power to the constant load.

At the same time, the following also describes the operation of the driving signal output circuit 120 outputting the driving signal Vq1 to drive the NMOS transistor 26a, based on the ON period Vy.

First, in response to the inductor current IL1 decreasing to the current value I0 at time t0, the comparator circuit 122 changes the signal Vc1 to high. Then, in response to the signal Vc1 going high, the RS flip-flop circuit 124 outputs the high signal Vq1.

In response to the driving signal Vq1 going high, the NMOS transistor 26a is turned on, and thus the inductor current IL1 increases.

Further, in response to the driving signal Vq1 going high, the count value of the counter 126 is incremented, and thus the signal Vont1 increases as well. Then, in response to the level of signal Vont1 exceeding that of the ON period Vy at time t1, the comparator circuit 128 changes the signal Vc2 to high. As a result, the RS flip-flop circuit 124 is reset, and the driving signal Vq1 goes low.

In response to the driving signal Vq1 going low, the NMOS transistor 26a is turned off. As a result, the inductor current IL1 gradually decreases. Further, in response to the inductor current IL1 decreasing to zero at time t2, the operation at time t0 is repeated.

Here, when the AC-DC converter 10 is generating the output voltage Vout at the target level from the predetermined AC voltage Vac, the capacitance of the capacitor 22 is sufficiently large and the feedback voltage Vfb is substantially constant within the time period corresponding to about one period of Vac. As a result, the ON period Vy outputted from the command output circuit 100 also becomes substantially constant, and thus the time period during which the NMOS the transistor 26a is on (e.g., the time period from time t0 to t1) results in being substantially constant as well.

Figure 6:
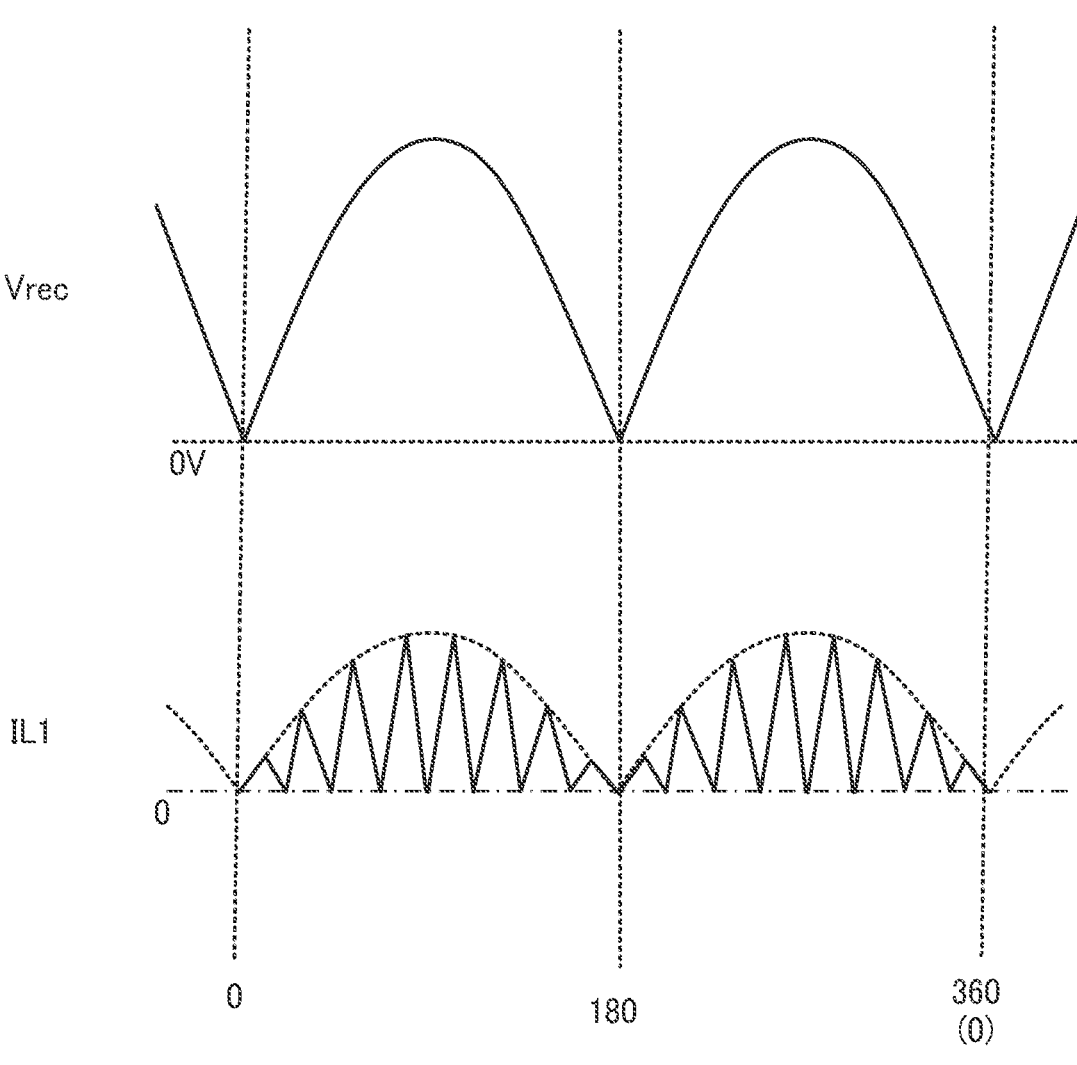
FIG. 6 is a diagram for explaining main waveforms of an AC-DC converter 10.

Further, when NMOS the transistor 26a is turned on, the current value of the inductor current IL1 increases with a rise in the level of the voltage Vrec obtained by rectifying the AC voltage Vac. As a result, the waveform of the peak values of the inductor current IL1 results in being similar to the voltage Vrec, as illustrated in FIG. 6.

As the level of the peak value of the inductor current IL1 when the NMOS transistor 26a is turned off rises, the time period for the inductor current IL1 to reach zero when NMOS the transistor 26a is off increases. Accordingly, when the level of voltage Vrec is low, the switching frequency of the NMOS transistor 26a rises, and when the level of voltage Vrec is high, the switching frequency of the NMOS transistor 26a drops.

<<<Operation of Switching Control Circuit 43a when Load 11 Changes from Light Load State to Heavy Load State>>>

Figure 7:
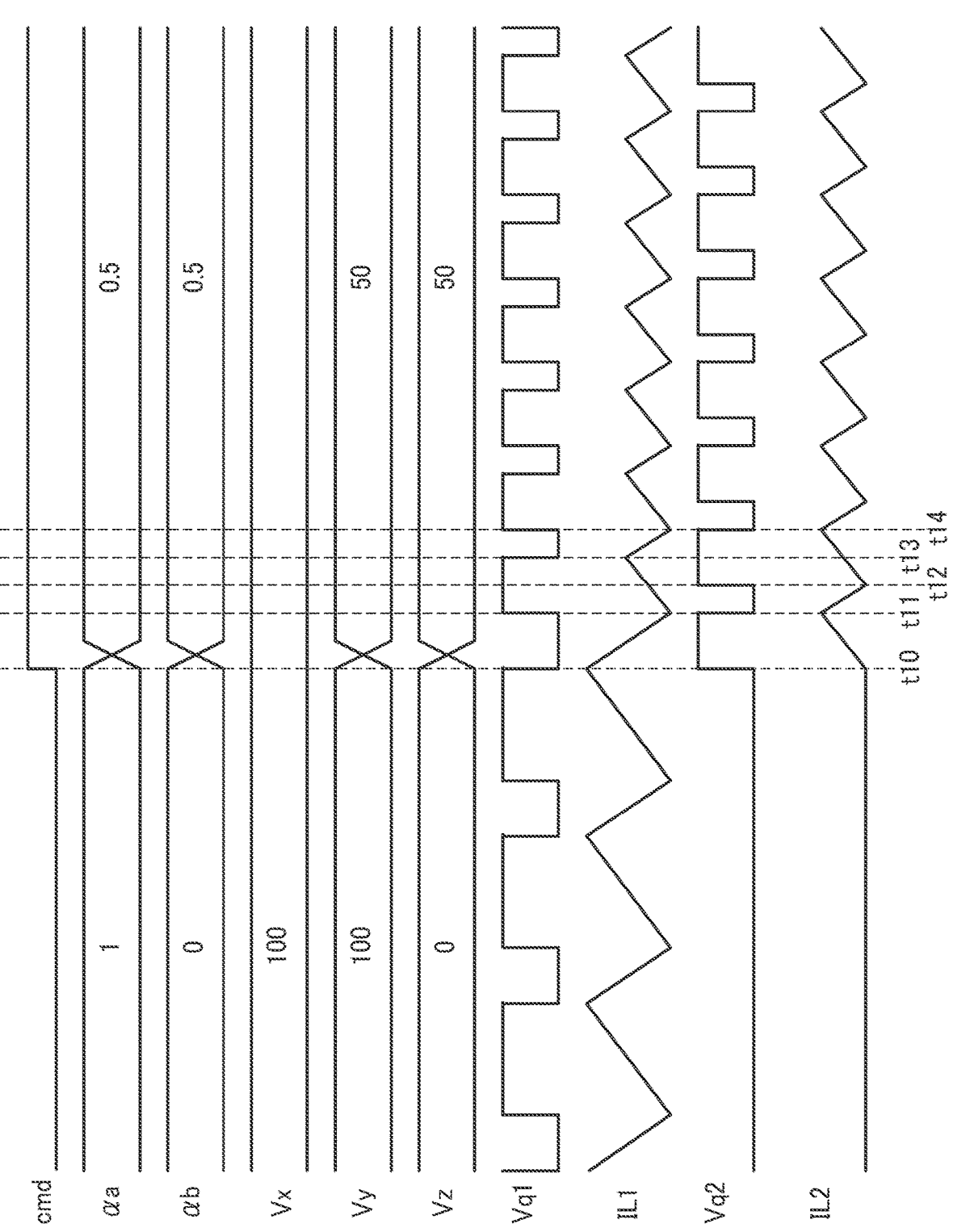

FIG. 7 is a diagram illustrating main waveforms of the switching control circuit 43a when the load 11 changes from the light load state to the heavy load state. It is assumed that before time t10, the load 11 is in the light load state, and thus the load detection circuit 12 outputs the low signal cmd, and the feedback voltage Vfb is such a voltage at which the voltage regulator circuit 104 outputs the ON period Vx of "100". Further, the multiplier circuit 110 outputs the ON period Vy of "100" and the multiplier circuit 112 outputs the ON period Vz of "0". Before time t10, the switching control circuit 43a is performing the operation as described with reference to FIG. 5.

Upon detecting that the load has changed from the light load state to the heavy load state at time t10, the load detection circuit 12 outputs the high signal cmd. In response to the load detection circuit 12 outputting the high signal cmd, the ratio output circuit 106 outputs the ratio αb of "0.5". In response to the ratio αb of "0.5" being outputted, the subtractor circuit 108 outputs the ratio αa of "0.5". In response to the ratios αa, αb of "0.5" being outputted, the multiplier circuits 110, 112 output the ON periods Vy, Vz of "50", respectively.

In response to the ON periods Vy, Vz of "50" being outputted, the driving signal output circuit 140 outputs the driving signal Vq2 to turn on the NMOS transistor 26b, since the inductor current IL2 is zero. Upon turning on of the NMOS transistor 26b, the inductor current IL2 starts to increase.

At time t11 at which the ON period of the NMOS transistor 26b is the ON period Vz of "50", the driving signal output circuit 140 outputs the driving signal Vq2 to turn off the NMOS transistor 26b. Thereafter, the inductor current IL2 starts to decrease. Further, at time t11, in response to the inductor current IL1 reaching zero, the driving signal output circuit 120 outputs the driving signal Vq1 to turn on the NMOS transistor 26a.

At time t12 at which the inductor current IL2 decreases to zero, the driving signal output circuit 140 outputs the driving signal Vq2 to turn on the NMOS transistor 26b. Thereafter, the driving signal output circuit 140 repeats the same operation.

At time t13 at which the ON period of the NMOS transistor 26a is the ON period Vy of "50", the driving signal output circuit 120 outputs the driving signal Vq1 to turn off the NMOS transistor 26a. Thereafter, the inductor current IL1 starts to decrease.

At time t14 at which the inductor current IL1 reaches zero, the driving signal output circuit 120 outputs the driving signal Vq1 to turn on the NMOS transistor 26a. Thereafter, the driving signal output circuit 120 repeats the same operation.

As such, when the load 11 is in the light load state, the switching control circuit 43a drives only the NMOS transistor 26a with the ON period Vy that is the ON period Vx based on the feedback voltage Vfb. Meanwhile, in response to the load 11 changing from the light load state to the heavy load state, the switching control circuit 43a drives the NMOS transistors 26a, 26b with the ON periods Vy, Vz each being a half of the ON period Vx. That is, the switching control circuit 43a controls the total of the ON periods Vy, Vz so as to be equal to the ON period Vx, thereby suppressing an increase in the input and output currents caused by an increase in the ON period and suppress a disturbance of the input current in association with a rise in the output voltage.

Accordingly, unlike the case where, while the NMOS transistor 26a is driven with the ON period Vy that is the ON period Vx, the NMOS transistor 26b starts to be driven with the ON period of a value equal or close thereto, the total amount of the input current of the AC-DC converter 10 remains substantially unchanged. Thus, even if the load 11 enters the heavy load state and the two boost chopper circuits start operating, the AC-DC converter 10 does not supply an excessive output current to the load 11, thereby suppressing a rise in the output voltage Vout causing a disturbance of the input current.

Further, here, in the case of using so-called soft start in which the ON period Vz is gradually increased from zero to a half of the ON period Vx, while the ON period Vy is gradually reduced from the ON period Vx to a half of the ON period Vx, it is possible to suppress a change in the amplitude of the input current and a rise in the output. However, by this method, the frequencies of the driving signals Vq1, Vq2 do not match until the ON periods Vy, Vz become equal to each other.

Further, if the frequencies of the driving signals Vq1, Vq2 are different even slightly, the NMOS transistors 26a, 26b cannot be turned on in a predetermined phase relationship such that the two boost chopper circuits perform an interleaved operation. Thus, the interleaved operation is not viable during a soft start period.

In particular, when the frequencies of the driving signals Vq1, Vq2 are slightly different, a low frequency component, so-called beat frequency, is generated due to the difference in the frequencies, which causes a concern of occurrence of an unexpected disturbance of the input current due to resonance with a filter. Further, as will be described below, the same concern arise in the case where the NMOS transistor 26b is stopped when the load 11 changes from the heavy load state to the light load state.

<<<Operation of Switching Control Circuit 43a when Load 11 Changes from Heavy Load State to Light Load State>>>

Figure 8:
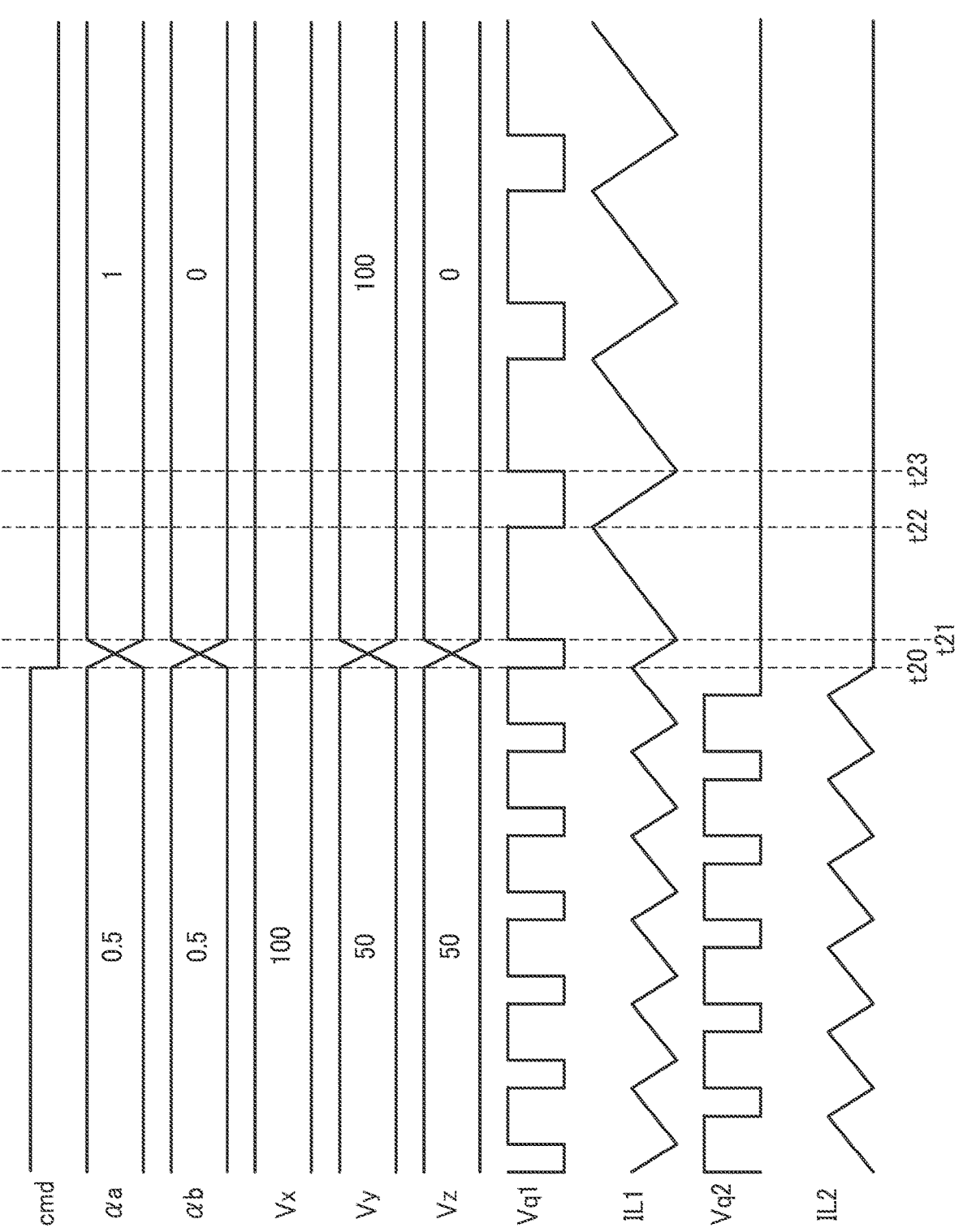

FIG. 8 is a diagram illustrating main waveforms of the switching control circuit 43a when the load 11 changes from the heavy load state to the light load state. It is assumed that before time t20, the load 11 is in the heavy load state, the load detection circuit 12 outputs the high signal cmd, and the feedback voltage Vfb is such a voltage at which the voltage regulator circuit 104 outputs the ON period Vx of "100". Further, the multiplier circuit 110 outputs the ON period Vy of "50", and the multiplier circuit 112 outputs the ON period Vz of "50". Further, before time t20, the switching control circuit 43a performs the operation as described with reference to FIG. 7.

Upon detecting that the load 11 has changed from the heavy load state to the light load state at time t20, the load detection circuit 12 outputs the low signal cmd. In response to the load detection circuit 12 outputting the low signal cmd, the ratio output circuit 106 outputs the ratio ab of "0". In response to the ratio αb of "0" is outputted, the subtractor circuit 108 outputs the ratio αa of "1.0". In response to the ratio αa of "1.0" and the ratio αb of "0" being outputted, the multiplier circuit 110 outputs the ON period Vy of "100", and the multiplier circuit 112 outputs the ON period Vz of "0".

Then, in response to the ON period Vy of "100" and the ON period Vz of "0" being outputted, the driving signal output circuit 140 outputs the driving signal Vq2 to turn off the NMOS transistor 26b. Further, in response to the ON period of the NMOS transistor 26a being the ON period Vy of "50", the driving signal output circuit 120 outputs the driving signal Vq1 to turn off the NMOS transistor 26a. Thereafter, the inductor current IL1 starts to decrease.

At time t21 at which the inductor current IL1 decreases to zero, the driving signal output circuit 120 outputs the driving signal Vq1 to turn on the NMOS transistor 26a.

At time t22 at which the ON period of the NMOS transistor 26a becomes the ON period Vy of "100", the driving signal output circuit 120 outputs the driving signal Vq1 to turn off the NMOS transistor 26a. Thereafter, the inductor current IL1 starts to decrease.

At time t23 at which the inductor current IL1 reaches zero, the driving signal output circuit 120 outputs the driving signal Vq1 to turn on the NMOS transistor 26a. Thereafter, the driving signal output circuit 120 repeats the same operation.

In this way, when the load 11 is the heavy load state, the switching control circuit 43a drives the NMOS transistors 26a, 26b with the ON periods Vy, Vz, which are equal to a half of the ON period Vx. Meanwhile, in response to the load 11 changes from the heavy load state to the light load state, the switching control circuit 43a drives only the NMOS transistor 26a with the ON period Vy that is the ON period Vx based on the feedback voltage Vfb.

Accordingly, the state in which the NMOS transistors 26a, 26b are driven with the ON periods Vy, Vz that are equal to a half of the ON period Vx is changed into the state in which only the NMOS transistor 26a is driven with the ON period Vy that is the ON period Vx. This enables the switching control circuit 43a to shift from the operation of two boost chopper circuits to the operation of one boost chopper circuit, without changing the total amount of the input current of the AC-DC converter 10, thereby being able to suppress a drop in the output voltage Vout and a disturbance of the input current.

OTHER EMBODIMENTS

Figure 9:
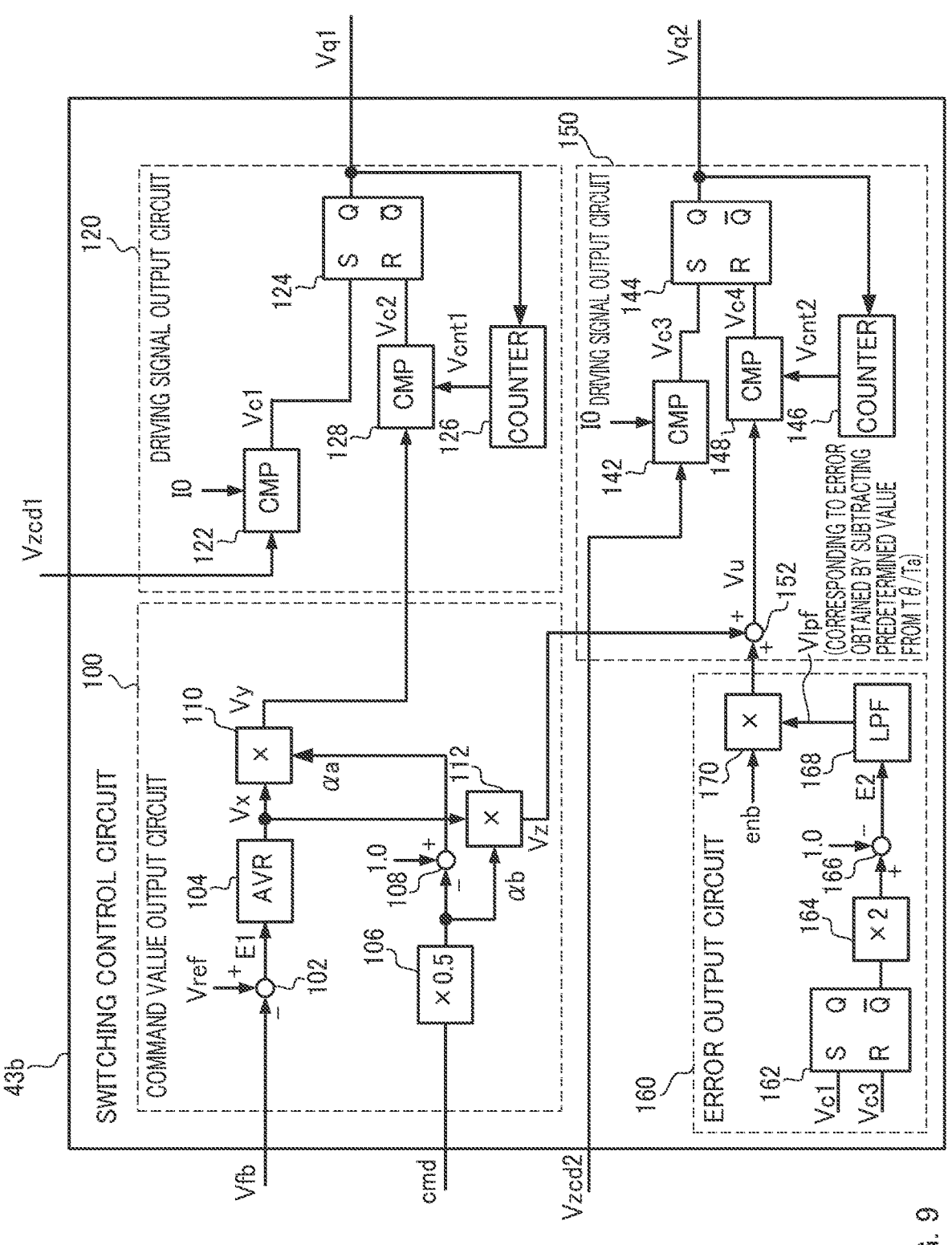
FIG. 9 is a diagram illustrating an example of a switching control circuit 43b.

The above description focuses only on the ON period and the amplitudes of the inductor currents IL1, IL2 with the ON period, however, in order for the two boost chopper circuits to perform the interleaved operation, a means of performing control such that the driving signals Vq1, Vq2 have a predetermined phase relationship is needed. FIG. 9, which will be described below, illustrates a switching control circuit 43b in which the means of controlling the driving signals Vq1, Vq2 so as to have the predetermined phase relationship is added to the switching control circuit 43a.

==Configuration of Switching Control Circuit 43b==

FIG. 9 is a diagram illustrating an example of the switching control circuit 43b. The switching control circuit 43b outputs the driving signals Vq1, Vq2, based on the inductor currents IL1, IL2, the feedback voltage Vfb, and the signal cmd, as with the switching control circuit 43a. Specifically, the switching control circuit 43b operates as with the switching control circuit 43a when the load 11 is in the light load state.

Meanwhile, when the load 11 is in the heavy load state, the switching control circuit 43b outputs the driving signal Vq1 to turn on the NMOS transistor 26a, in response to the inductor current IL1 reaching zero and the voltage Vzcd1 corresponding to the inductor current IL1 reaching the first predetermined voltage value. Meanwhile, when the load 11 is in the heavy load state, the switching control circuit 43b outputs the driving signal Vq2 to turn on the NMOS transistor 26b, in response to the inductor current IL2 reaching zero and the voltage Vzcd2 corresponding to the inductor current IL2 reaching the second predetermined voltage value. Thereafter, the switching control circuit 43b outputs the driving signals Vq1, Vq2 to turn off the NMOS transistors 26a, 26b, in response to the ON periods Vy, Vz having elapsed, respectively, which are obtained by multiplying the ON period Vx by the ratio (e.g., 0.5 in an embodiment of the present disclosure) for the two boost chopper circuits to supply power to the load 11 in a balanced manner. Further, the switching control circuit 43b outputs the driving signals Vq1, Vq2 to drive the NMOS transistors 26a, 26b such that the two boost chopper circuits maintain the appropriate interleaved operation. The switching control circuit 43b includes the command value output circuit 100, the driving signal output circuit 120, a driving signal output circuit 150, and an error output circuit 160.

==Driving Signal Output Circuit 150==

The driving signal output circuit 150 outputs the driving signal Vq2 to drive the NMOS transistor 26b, based on the voltage Vzcd2 corresponding to the inductor current IL2, the ON period Vz, and the ON period Vlpf from the error output circuit 160 (described later). Note that the ON period Vlpf corresponds to the time difference TO between the on-timings of the NMOS transistors 26a, 26b, and, specifically, corresponds to an error between a predetermined value and a result obtained by dividing the time difference TO by the switching period Ta of the NMOS transistor 26a, which will be described later in detail.

Specifically, when the load 11 is in the heavy load state, the driving signal output circuit 150 outputs the driving signal Vq2 to turn on the NMOS transistor 26b after the inductor current IL2 reaches zero. Thereafter, the driving signal output circuit 150 outputs the driving signal Vq2 to turn off the NMOS transistor 26b after a lapse of an ON period Vu according to the ON periods Vz, Vlpf. The driving signal output circuit 150 includes the comparator circuits 142, 148, the RS flip-flop circuit 144, the counter 146, and an adder circuit 152.

The adder circuit 152 adds the ON period Vlpf from the error output circuit 160 to the ON period Vz, to thereby output a result as the ON period Vu. Note that details of the error output circuit 160 will be described later. Further, the ON period Vu corresponds to a "fourth time period."

===Error Output Circuit 160===

The error output circuit 160 outputs the ON period Vlpf to adjust the ON period Vu, which is the ON period of the NMOS transistor 26b, such that the two boost chopper circuits perform the appropriate interleaved operation, based on the on-timings of the NMOS transistors 26a, 26b.

Specifically, the error output circuit 160 outputs the positive ON period Vlpf when the on-timing of the NMOS transistor 26b advances with respect to the on-timing of the NMOS transistor 26a. This causes the ON period Vu to be longer than the ON period Vz, and the on-timing at which the NMOS transistor 26b is turned on later is delayed.

Meanwhile, the error output circuit 160 outputs the negative ON period Vlpf, in response to the on-timing of the NMOS transistor 26b being delayed with respect to the on-timing of the NMOS transistor 26a. This causes the ON period Vu to be shorter than the ON period Vz, and the on-timing at which the NMOS transistor 26b is turned on later becomes earlier.

The error output circuit 160 includes an RS flip-flop circuit 162, a level shifter circuit 164, a subtractor circuit 166, a low-pass filter (LPF) 168, and a multiplier circuit 170.

Note that upon receiving a low signal enb, the multiplier circuit 170 outputs the ON period Vlpf of "0", which will be described later in detail. Further, the on-timing of the NMOS transistor 26a corresponds to a "first timing", the on-timing of the NMOS transistor 26b corresponds to a "second timing", and the ON period Vlpf corresponds to an "error".

The RS flip-flop circuit 162 detects the time difference Tθ between the on-timings of the NMOS transistors 26a, 26b and the switching period Ta of the NMOS transistor 26a, to thereby output a signal Q bar indicating a ratio R between the time difference TO and the switching period Ta. Specifically, upon receiving the high signal Vc1, the RS flip-flop circuit 162 outputs the low signal Q bar, and upon receiving the high signal Vc3, the RS flip-flop circuit 162 outputs the high signal Q bar.

Thus, the RS flip-flop circuit 162 detects the time difference Tθ in the time period during which the signal Q bar is low, and detects the switching the period Ta every time the signal Q bar goes low. Accordingly, the signal Q bar from RS flip-flop circuit 162 is a signal indicating the duty (i.e., ratio) of the time difference TO between the inductor currents IL1 and IL2 with respect to the switching period Ta. Note that the ratio R corresponds to a "ratio".

The level shifter circuit 164 levels-shifts the signal Q bar from the RS flip-flop circuit 162 in order to simplify the circuit configuration in an embodiment of the present disclosure, which will be described later in detail. Specifically, when the RS flip-flop circuit 162 operates with the power supply voltage Vdd, with the voltage level of the low signal Q bar from the RS flip-flop circuit 162 being maintained at the ground level, the level shifter circuit 164 causes the voltage level of the high signal Q bar to be twice the voltage level of Vdd.

The subtractor circuit 166 subtracts a value (e.g., "1.0" in an embodiment of the present disclosure) indicating the predetermined ratio (e.g., "50%" in an embodiment of the present disclosure) from the level of the signal from the level shifter circuit 164, to thereby output a result as an error E2.

Thus, the subtractor circuit 166 causes the low-pass filter 168 to output the ON period Vlpf of "0", when the ratio R between the time difference TO and the switching period Ta matches the predetermined ratio. Specifically, the subtractor circuit 166 subtracts the power supply voltage Vdd corresponding to the value "1.0" indicating the predetermined ratio, from the signal from the level shifter circuit 164, which changes in a range from 0 V to (2×Vdd) V, to thereby output a result as the error E2.

This makes it possible that when the ratio R between the time difference Tθ and the switching period Ta matches the predetermined ratio, and the level shifter circuit 164 outputs such a signal that the ratio of a low period per one switching period Ta is 50%, the subtractor circuit 166 causes the low-pass filter 168 to output the ON period Vlpf of "0". Further, as such, in an embodiment of the present disclosure, when the ratio R between the time difference TO and the switching period Ta matches the predetermined ratio by setting the value to be subtracted by the subtractor circuit 166 to the value "1.0" indicating the predetermined ratio, the subtractor circuit 166 can cause the low-pass filter 168 to output the ON period Vlpf of "0", easily.

Note that an embodiment of the present disclosure describes the case of causing the two boost chopper circuits to perform the interleaved operation, case, the phase difference Δθ to perform the appropriate interleaved operation is 360 degrees/2=180 degrees in one switching period. Further, assuming that the phase difference 40 in one switching period Ta is 180 degrees, the predetermined ratio results in 50%.

Further, when the predetermined ratio is 50%, the subtractor circuit 166 subtracts the value of "1.0" indicating the predetermined ratio (50%) from the level-shifted signal. This enables the subtractor circuit 166 to cause the low-pass filter 168 to output the ON period Vlpf of zero, when the ratio R between the time difference Tθ and the switching period Ta matches the predetermined ratio.

Meanwhile, when n (n is 3 or more) the boost chopper circuits perform the interleaved operation, the phase difference 40 to perform the appropriate interleaved operation is 360 degrees/n in one switching period Ta. Further, assuming that the phase difference 40 in one switching period Ta is 360 degrees/n, the predetermined ratio is (100/n) %.

Further, when the predetermined ratio is (100/n) %, the subtractor circuit 166 subtracts a value (2/n) indicating the predetermined ratio (100/n) % from the level-shifted signal. Thus, when the ratio R between the time difference TO and the switching period Ta matches the predetermined ratio, the subtractor circuit 166 can cause the low-pass filter 168 to output the ON period Vlpf of zero.

Hereinabove, the case has been described in which the level shifter circuit 164 level-shifts the signal Q bar from the RS flip-flop circuit 162 to a signal of a voltage level of (2×Vdd) V. Meanwhile, when the level shifter circuit 164 level-shifts the signal Q bar from the RS flip-flop circuit 162 to a signal of a voltage level of (p×Vdd) V (where p is a positive real number), and when n the boost chopper circuits perform the interleaved operation, the subtractor circuit 166 subtracts a value (p/n) indicating the predetermined ratio from the level-shifted signal. This makes it possible that when the ratio R between the time difference T$\theta$ and the switching period Ta match the predetermined ratio, the subtractor circuit 166 causes the low-pass filter 168 to output the ON period Vlpf of zero.

The low-pass filter (LPF) 168 integrates the error E2 from the subtractor circuit 166, to thereby output the ON period Vlpf.

When the signal enb is high, the multiplier circuit 170 multiplies the ON period Vlpf by "1", to thereby output a result as the ON period Vlpf, and when the signal enb is low, the multiplier circuit 170 multiplies the ON period Vlpf by "0", to thereby output a result as the ON period Vlpf. Note that the enable circuit (not illustrated) changes the signal enb to high after the driving signal output circuit 150 outputs the driving signal Vq2 to turn on the NMOS transistor 26b once or more, and changes the signal enb to low in response to the load detection circuit 12 outputting the low signal cmd.

With the error output circuit 160 being configured as described above, even if the switching frequency of the NMOS transistor 26a decreases, the switching frequency of the NMOS transistor 26b remains high, and when the time difference T$\theta$ decreases, the ratio R exceeds the predetermined ratio, and the ON period Vlpf becomes a positive value. In this case, the ON period Vu results in being longer than the ON period Vz.

Then, since the ON period Vu of the NMOS transistor 26b increases, the peak value of the inductor current IL2 increases, the switching period of the NMOS transistor 26b increases, and the switching frequency drops. Further, with an increase in the switching period of the NMOS transistor 26b, the timing at which the NMOS transistor 26b is turned on next is delayed, and the ratio R decreases and approaches the predetermined ratio.

Meanwhile, even if the switching frequency of the NMOS transistor 26a rises, the switching frequency of the NMOS transistor 26b remains low, and when the time difference T$\theta$ increases, the ratio R decreases below the predetermined ratio, and the ON period Vlpf becomes a negative value. In this case, the ON period Vu results in being shorter than the ON period Vz.

Then, since the ON period Vu of the NMOS transistor 26b decreases, the peak value of the inductor current IL2 decreases, the switching period of the NMOS transistor 26b decreases, and the switching frequency rises. Further, with a decrease in the switching period of the NMOS transistor 26b, the timing at which the NMOS transistor 26b is turned on next becomes earlier, and the ratio R increases and approaches the predetermined ratio.

As such, the adder circuit 152 of the driving signal output circuit 150 outputs the ON period Vu according to the ON period Vz and the ON period Vlpf, so that the switching control circuit 43b can control the switching of the NMOS transistor 26b so as to maintain the appropriate interleaved operation, while following changes in the switching frequency of the NMOS transistor 26a.

<<<Operation of Switching Control Circuit 43b when Load 11 Changes from Light Load State to Heavy Load State>>>

Figure 10:
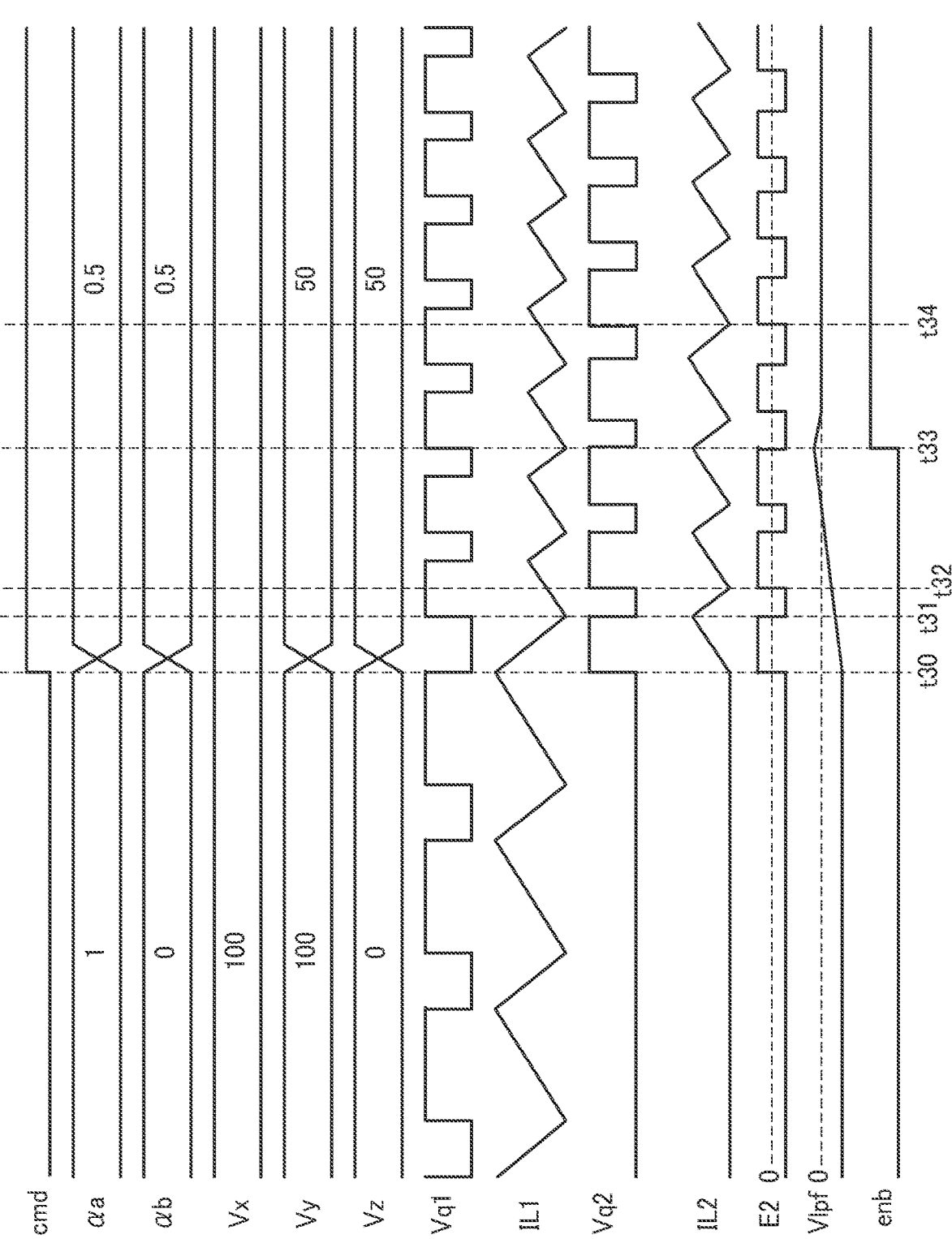
FIG. 10 is a diagram illustrating main waveforms of a switching control circuit 43b.

FIG. 10 is a diagram illustrating main waveforms of the switching control circuit 43b when the load 11 changes from the light load state to the heavy load state. It is assumed that before time t30, the load 11 is in the light load state, and thus the load detection circuit 12 outputs the low signal cmd, and the feedback voltage Vfb is such a voltage at which the voltage regulator circuit 104 outputs the ON period Vx of "100". Further, the multiplier circuit 110 outputs the ON period Vy of "100", and the multiplier circuit 112 outputs the ON period Vz of "0". Further, before time t30, the switching control circuit 43b performs the operation as described with reference to FIG. 5.

At time t30, in response to the load detection circuit 12 detecting that the load 11 changes from the light load state to the heavy load state, the load detection circuit 12 outputs the high signal cmd. In response to the load detection circuit 12 outputting the high signal cmd, the ratio output circuit 106 outputs the ratio ab of "0.5". In response to the ratio $\alpha$b of "0.5" being outputted, the subtractor circuit 108 outputs the ratio $\alpha$a of "0.5". In response to the ratios $\alpha$a, $\alpha$b of "0.5" being outputted, the multiplier circuits 110, 112 output the ON periods Vy, Vz of "50", respectively.

In response to the ON periods Vy, Vz of "50" being outputted, the driving signal output circuit 150 outputs the driving signal Vq2 to turn on the NMOS transistor 26b, since the inductor current IL2 is zero. Upon turning on of the NMOS transistor 26b, the inductor current IL2 starts to increase.

Thereafter, since the NMOS transistor 26b is turned on, the time difference T$\theta$ starts to be detected, and thus the error E2 changes from "−1" to "+1". Upon a change in the error E2, the low-pass filter 168 starts to increase the ON period Vlpf.

The operation of the switching control circuit 43b from time t31 to t32 is the same as the operation of the switching control circuit 43a from t11 to t12 in FIG. 6, and thus the description thereof is omitted.

At time t33 at which the ON period of the NMOS transistor 26a becomes the ON period Vy of "50", the driving signal output circuit 120 outputs the driving signal Vq2 to turn off the NMOS transistor 26b. Thereafter, the inductor current IL2 starts to decrease. Further, the enable circuit (not illustrated) changes the signal enb to high because the driving signal output circuit 150 outputs the driving signal Vq2 to turn on the NMOS transistor 26b once or more. Thereafter, the error output circuit 160 starts outputting the ON period Vlpf such that the two boost chopper circuits accurately perform the interleaved operation, and the driving signal output circuit 150 starts outputting the driving signal Vq2 to drive the NMOS transistor 26b with the ON period Vu based on the ON period Vlpf and the ON period Vz.

At time t34 at which the two boost chopper circuits start to accurately perform the interleaved operation, the low-pass filter 168 outputs the ON period Vlpf of "0". Thereafter, the NMOS transistors 26a, 26b are driven such that the two boost chopper circuits accurately perform the interleaved operation.

As such, in response to the ON period Vlpf from the error output circuit 160 being outputted to the driving signal output circuit 150 after the load 11 enters the heavy load state, the two boost chopper circuits accurately perform the interleaved operation.

<<<Simulation Results of Switching Control Circuit 43b>>>

Figure 11:
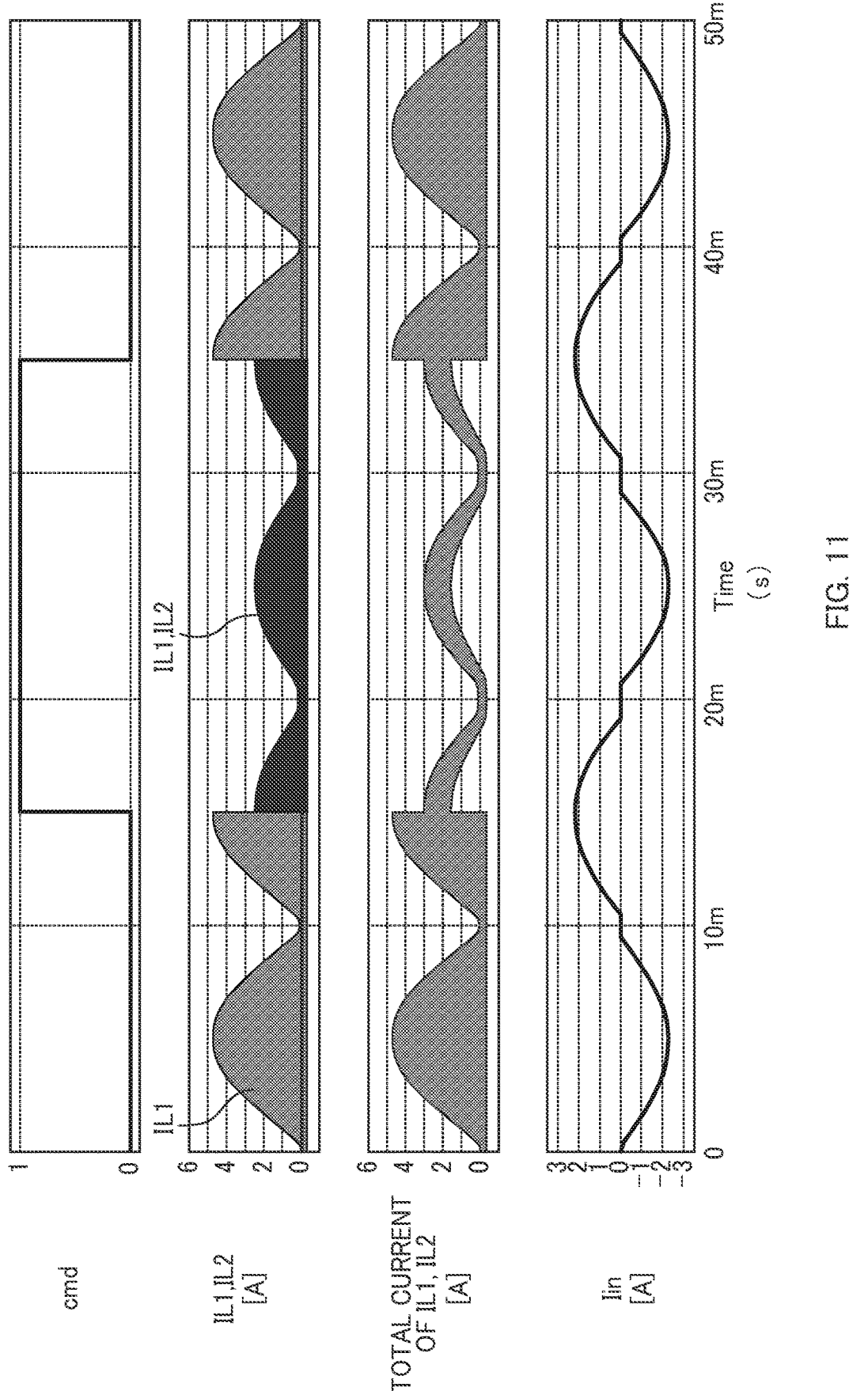
FIG. 11 is a diagram illustrating simulation results of a switching control circuit 43b.

FIG. 11 is a diagram illustrating simulation results of the switching control circuit 43b. Here, the top diagram illustrates the results indicating changes in the signal cmd. The second diagram from the top illustrates the results indicating the inductor currents IL1, IL2. The third diagram from the top illustrates the results indicating the total current of the inductor currents IL1, IL2. Furthermore, the bottom diagram illustrates the results indicating the input current Iin.

First, referring to the top diagram, the load detection circuit 12 outputs the high signal cmd around Time=15 ms. Then, the load detection circuit 12 outputs the low signal cmd around Time=35 ms. Other simulation results will be described below in consideration of these changes in the signal cmd.

In Time=0 to 15 ms, the switching control circuit 43b drives only the NMOS transistor 26a because the load 11 is in the light load state. Accordingly, in this event, only the inductor current IL1 flows. Thus, the total current of the inductor currents IL1, IL2 also results in only the inductor current IL1. Although the AC voltage Vac and the rectified voltage Vrec are not illustrated, the switching control circuit 43b in this time period performs the operation as described with reference to FIG. 5, and performs the power factor correcting operation in the critical mode, and thus the input current Iin results in being substantially in phase with the AC voltage Vac.

In Time=15 to 35 ms, the switching control circuit 43b drives the NMOS transistors 26a, 26b, because the load 11 is in the heavy load state. Accordingly, in this event, the inductor currents IL1, IL2 flow. Further, assuming that the feedback voltage Vfb does not change, the NMOS transistors 26a, 26b are driven with the ON period that is a half of the ON period of the NMOS transistor 26a during Time=0 to 15 ms.

Thus, the peak value of the inductor current IL1, IL2 results in a half of the peak value of the inductor current IL1 during Time=0 to 15 ms. Further, the switching control circuit 43b drives the NMOS transistors 26a, 26b such that the two boost chopper circuits perform the interleaved operation, and thus the total current of the inductor currents IL1, IL2 has a waveform in which ripples are superimposed on the low frequency components and the amplitude of the ripples decreases, unlike during Time=0 to 15 ms.

The operation of the switching control circuit 43b from Time=35 ms is the same as the operation during Time=0 to 15 ms, and thus the description thereof is omitted.

<<<Enlarged View of Simulation Results of Switching Control Circuit 43b>>>

Figure 12:
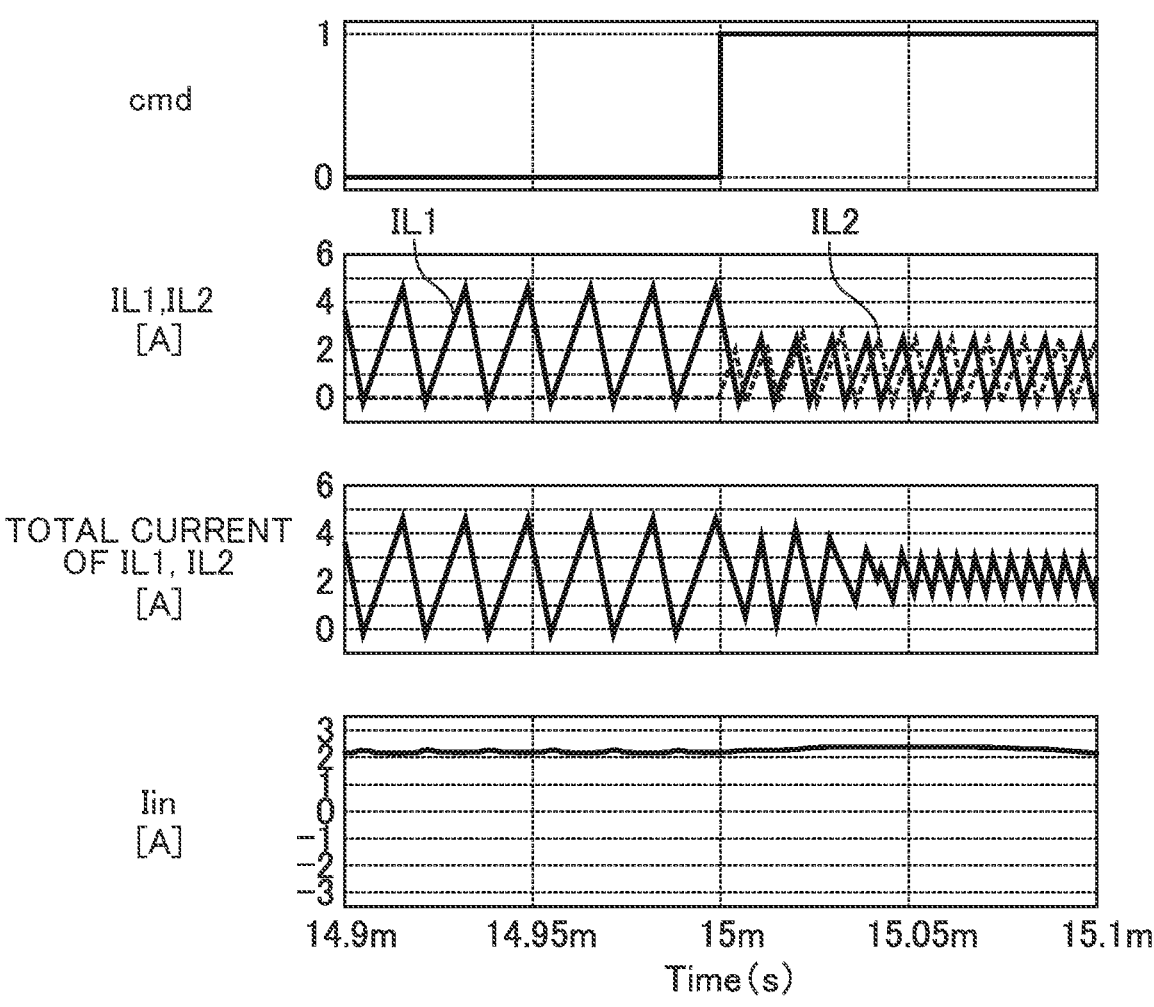
FIG. 12 is a diagram illustrating simulation results of a switching control circuit 43b.

FIG. 12 is an enlarged view of a portion corresponding to Time=14.9 to 15.1 ms of the simulation results of the switching control circuit 43b in FIG. 11. Furthermore, since the order in which the four simulation results are arranged is the same as in FIG. 10, the description thereof is omitted. Further, in FIGS. 11 and 12, the inductor current IL1 is given by the solid line, and the inductor current IL2 is given by the dashed line.

At Time=15 ms, in response to the load detection circuit 12 outputting the high signal cmd, the command value output circuit 100 outputs the ON periods Vy, Vz being a half of the ON period Vx. Then, the driving signal output circuit 150 starts driving the NMOS transistor 26b. In response to the NMOS transistor 26b starting to be driven, the total current of the inductor currents IL1, IL2 is disturbed, because the NMOS transistors 26a, 26b are not yet driven such that the two boost chopper circuits accurately perform the interleaved operation.

At Time=15.05 ms, the error output circuit 160 outputs the ON period Vlpf of "0", and the NMOS transistors 26a, 26b are driven such that the two boost chopper circuits accurately perform the interleaved operation. In association therewith, the total current of the inductor currents IL1, IL2 has a waveform in which ripples are superimposed on the low frequency components and the amplitude of the ripples decreases. Note that FIG. 12 is an enlarged view of the time period during Time=14.9 to 15.1 ms, and thus the input current Iin hardly changes.

Figure 13:
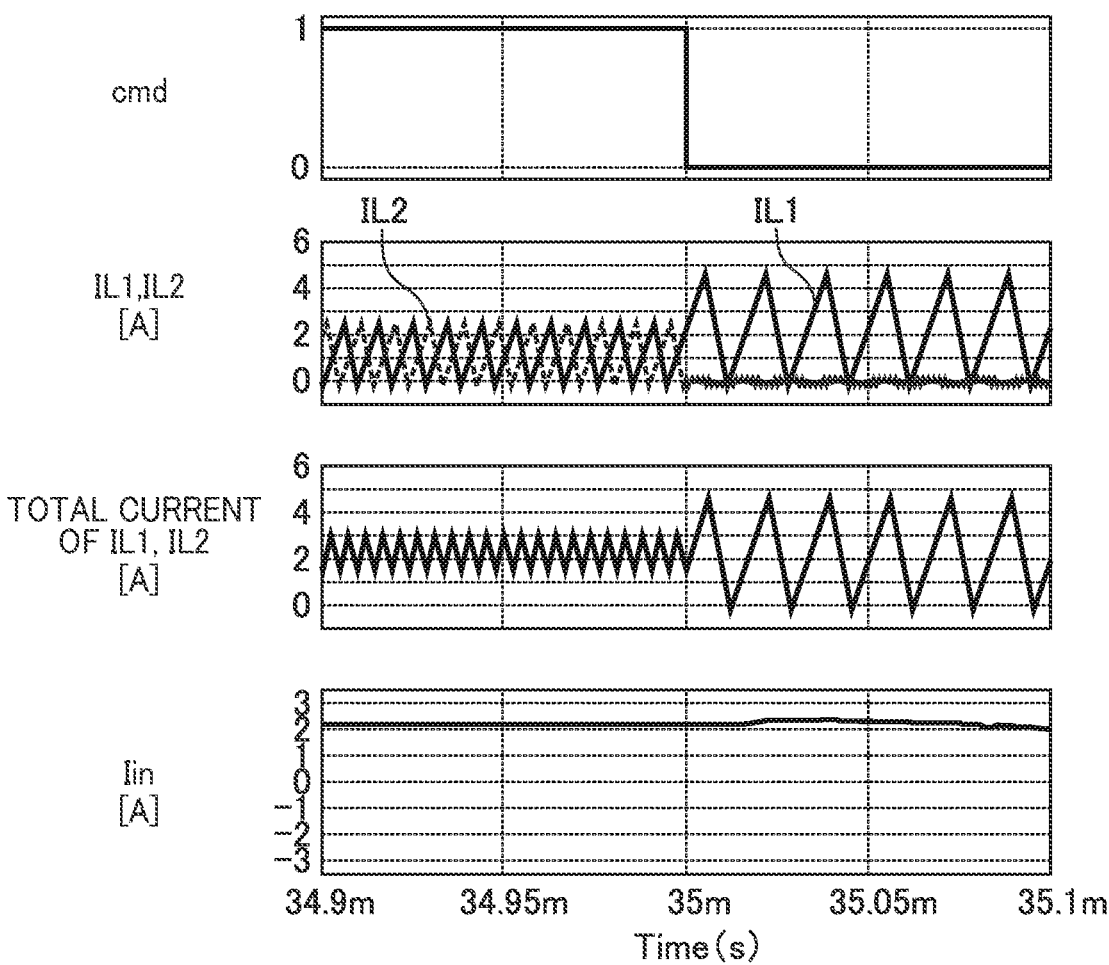
FIG. 13 is a diagram illustrating simulation results of a switching control circuit 43b.

FIG. 13 is an enlarged view of a portion corresponding to Time=34.9 to 35.1 ms of the simulation results of the switching control circuit 43b in FIG. 11. Furthermore, the order in which the four simulation results are arranged is the same as in FIG. 11, and thus the description thereof is omitted.

At Time=35 ms, in response to the load detection circuit 12 outputting the low signal cmd, the command value output circuit 100 outputs the ON period Vy that is the ON period Vx, and the ON period Vz of "0". Then, the driving signal output circuit 150 stops driving the NMOS transistor 26b. In response to the driving of the NMOS transistor 26b being stopped, the total current of the inductor currents IL1, IL2 results in only the inductor current IL1.

As such, when the load 11 changes from the heavy load state to the light load state, the total current of the inductor currents IL1, IL2 is not disturbed because only the driving of the NMOS transistor 26b is stopped. Note that FIG. 13 is an enlarged view of the time period during Time=34.9 to 35.1 ms in FIG. 11, and thus the input current Iin hardly changes.

The operation of the switching control circuit 43b has been described above, and in the switching control circuit 43b, the two boost chopper circuits can appropriately perform the interleaved operation as time passes. Furthermore, even immediately after the load 11 changes from the light load state to the heavy load state, the on-timing of the NMOS transistor 26b is controlled such that the two boost chopper circuits appropriately perform the interleaved operation, and switching control circuit 43c in which the two boost chopper circuits perform the interleaved operation to some extent will be described below.

==Configuration of Switching Control Circuit 43c==

Figure 14:
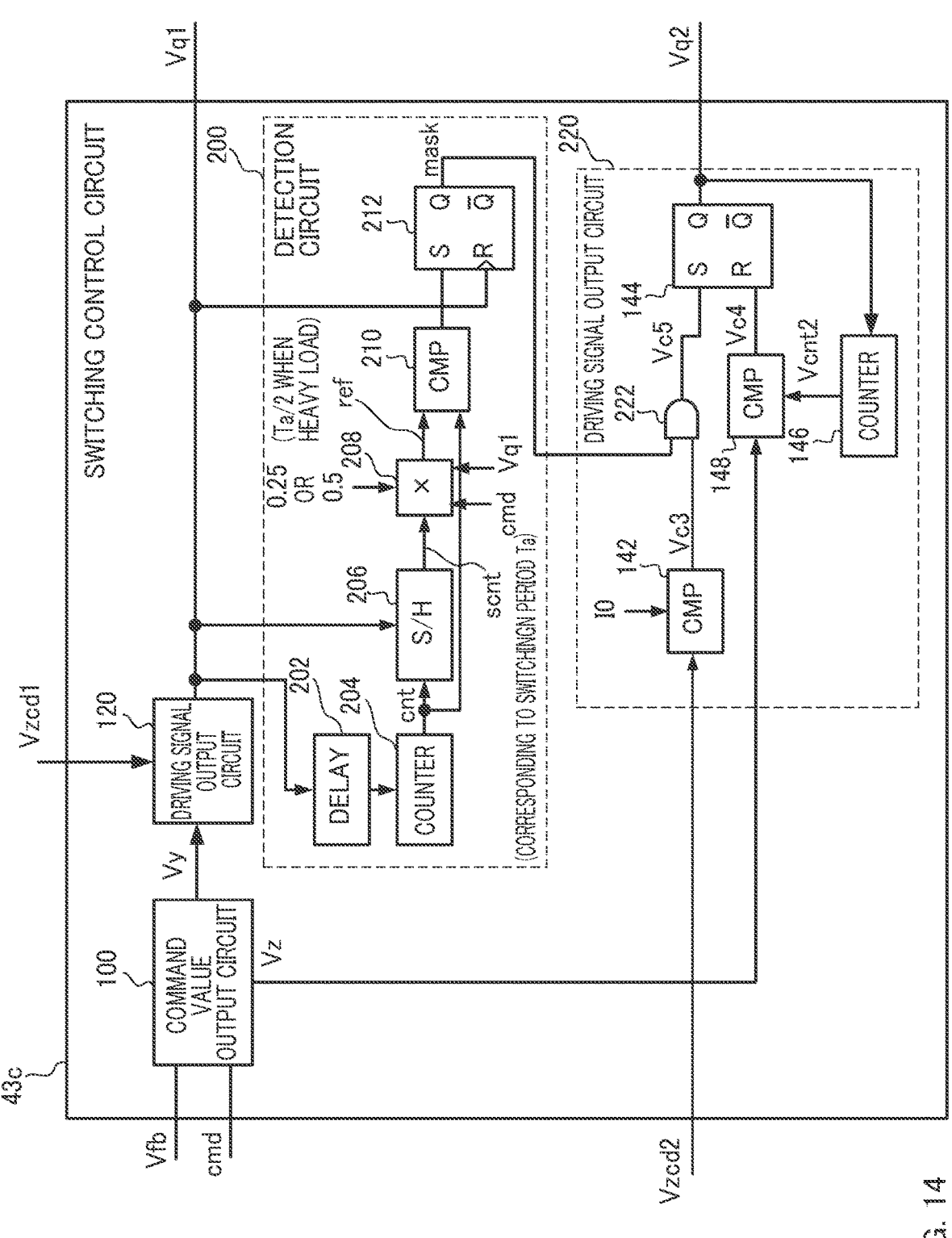
FIG. 14 is a diagram illustrating an example of a switching control circuit 43c.

FIG. 14 is a diagram illustrating an example of the switching control circuit 43c.

The switching control circuit 43c outputs the driving signals Vq1, Vq2, based on the inductor currents IL1, IL2, the feedback voltage Vfb, and the signal cmd, as with the switching control circuits 43a, 43b.

Specifically, the switching control circuit 43c outputs the driving signal Vq1 to turn on the NMOS transistor 26a, in response to the inductor current IL1 reaching substantially zero, and the voltage Vzcd1 corresponding to the inductor current IL1 reaching the first predetermined voltage value, when the load 11 is in the heavy load state.

After that, the switching control circuit 43c outputs the driving signal Vq2 to turn on the NMOS transistor 26b, in response to a half of the switching period Ta of the NMOS transistor 26a having elapsed, the inductor current IL2 reaching zero, and the voltage Vzcd2 corresponding to the inductor current IL2 reaching the second predetermined voltage value. The switching control circuit 43c includes the command value output circuit 100, the driving signal output circuit 120, a driving signal output circuit 220, and a detection circuit 200.

==Detection Circuit 200==

The detection circuit 200 detects the timing at which the NMOS transistor 26b is to be turned on, in response to the driving signal Vq1. Specifically, the detection circuit 200 detects the switching period Ta of the NMOS transistor 26a every time the driving signal Vq1 changes from low to high, and detects, from the above switching period Ta, the timing at which a half of the switching period Ta has elapsed since the NMOS transistor 26a is turned on next. Then, the detection circuit 200 controls the timing at which the driving signal output circuit 220 turns on the NMOS transistor 26*b*, based on the timing at which a half of the switching period Ta has elapsed. The detection circuit 200 includes a delay circuit 202, a counter 204, a sample-and-hold circuit 206, a multiplier circuit 208, a comparator circuit 210, and an RS flip-flop circuit 212.

The delay circuit (DELAY) 202 is a circuit to output a signal to reset the counter 204, and outputs the signal to reset the counter 204 after a lapse of the predetermined time period, in response to the driving signal output circuit 120 outputting the high driving signal Vq1. Note that the predetermined time period is the time period that is sufficiently short such that the detection circuit 200 correctly operates.

The counter 204 is a circuit to count to measure the switching period Ta of the NMOS transistor 26*a*, and after being reset by a reset signal from the delay circuit 202, the counter 204 starts counting from "0" and continues counting until being reset. Note that the counter 204 corresponds to a "timer circuit".

The sample-and-hold circuit (S/H) 206 is a circuit to hold the switching period Ta of the NMOS transistor 26*a*, and in response to the driving signal output circuit 120 outputting the high driving signal Vq1, the sample-and-hold circuit 206 samples and holds the count value cnt of the counter 204, to thereby output a result as a count value sont. Accordingly, the count value sont corresponds to the switching period Ta.

The multiplier circuit 208 is a circuit to output a count value ref indicating a half of the switching period Ta. Specifically, the multiplier circuit 208 multiplies the count value sont by "0.25", at the first rising edge of the driving signal Vq1 when the rising edge is counted from the input of the high signal cmd.

Further, in response to the load detection circuit 12 outputting the high signal cmd, the ON period Vy is halved and the switching period Ta is also halved, but at the first rising edge of the driving signal Vq1, the count value sont indicates the switching period Ta before the ON period Vy is halved (i.e., twice the switching period). Thus, at this timing, if the count value ref indicating a half of the switching period Ta is to be outputted, the count value sont needs to be multiplied by "0.25" to be outputted as the count value ref. This makes it possible that the multiplier circuit 208 outputs the count value ref indicating a half of the switching period Ta after the load detection circuit 12 outputs the high signal cmd.

Further, from the second rising edge of the driving signal Vq1 when the rising edge is counted from the input of the high signal cmd, the count value sont indicates the switching period Ta after the ON period Vy is halved. Thus, the multiplier circuit 208 multiplies the count value sont by "0.5", to thereby output a result as the count value ref. The count value ref in this case also indicates a half of the switching period Ta after the load detection circuit 12 outputs the high signal cmd.

Further, this enables the detection circuit 200 to maintain the timing at which the NMOS transistor 26*b* is turned on, at the timing after substantially a half of the switching period Ta of the NMOS transistor 26*a* or thereafter, which will be described later in detail. Accordingly, the switching control circuit 43*c* can drive the NMOS transistors 26*a*, 26*b* such that the two boost chopper circuits perform the interleaved operation to some extent. Note that when the multiplier circuit 208 receives the low signal cmd, the ON period Vz is "0" and the NMOS transistor 26*b* is not turned on, and thus the multiplier circuit 208 may output the count value ref of "0".

The comparator circuit 210 is a circuit to compare the count value cnt and the count value ref, to determine whether a half of the switching period Ta has elapsed since the NMOS transistor 26*a* is turned on. Specifically, the comparator circuit 210 outputs a high signal to set the RS flip-flop circuit 212, in response to the driving signal output circuit 120 outputting the high driving signal Vq1, the counter 204 starting to count, and the count value cnt exceeding the count value ref. Meanwhile, the comparator circuit 210 outputs a low signal when the count value cnt is smaller than the count value ref.

The RS flip-flop circuit 212 is a circuit to output a signal mask indicating the timing at which the NMOS transistor 26*b* is to be turned on, based on the signal from the comparator circuit 210 and the driving signal Vq1. Specifically, the RS flip-flop circuit 212 outputs the low signal mask, in response to the driving signal output circuit 120 outputting the high driving signal Vq1, and outputs the high signal mask, in response to the comparator circuit 210 outputting the high signal.

As such, in response to a half of the switching period Ta of the NMOS transistor 26*a* having elapsed since the NMOS transistor 26*a* is turned on, the detection circuit 200 notifies, using the signal mask, the driving signal output circuit 220 of the timing at which the NMOS transistor 26*b* is to be turned on. Then, the driving signal output circuit 220 outputs the driving signal Vq2 to turn on the NMOS transistor 26*b* in response to the signal mask, which will be described later in detail. This enables the switching control circuit 43*c* to drive the NMOS transistors 26*a*, 26*b* such that the two boost chopper circuits perform the interleaved operation while operating in the critical mode, to some extent.

==Driving Signal Output Circuit 220==

The driving signal output circuit 220 outputs the driving signal Vq2 to drive the NMOS transistor 26*b*, based on the voltage Vzcd2 corresponding to the inductor current IL2, the ON period Vz, and the signal mask. Specifically, the driving signal output circuit 220 outputs the driving signal Vq2 to turn on the NMOS transistor 26*b*, in response to receiving the high signal mask from the detection circuit 200, the inductor current IL2 reaching zero, and the voltage Vzcd2 corresponding to the inductor current IL2 reaching the second predetermined voltage value. Thereafter, the driving signal output circuit 220 outputs the driving signal Vq2 to turn off the NMOS transistor 26*b*, in response to the time period corresponding to the ON period Vz having elapsed. The driving signal output circuit 220 includes the comparator circuits 142, 148, the RS flip-flop circuit 144, the counter 146, and an AND circuit 222.

The AND circuit 222 is a circuit to determine the timing at which the NMOS transistor 26*b* is turned on, and calculate the logical product of the signal Vc3 from the comparator circuit 142 and the signal mask from the detection circuit 200, to thereby output a result as a signal Vc5. Specifically, the AND circuit 222 outputs the high signal Vc5, in response to the detection circuit 200 outputting the high signal mask and the inductor current IL2 reaching zero. This ensures that the timing at which the NMOS transistor 26*b* is turned on is at or after the timing at which a half of the switching period Ta has elapsed since the NMOS transistor 26*a* is turned on.

Note that the driving signal output circuit 220 outputs the driving signal Vq2 to turn on the NMOS transistor 26*b*, in response to the load 11 changing to the heavy load state, the time period of a quarter of the switching period Ta having elapsed after an occurrence of one rising edge of the driving signal Vq1, and a first condition that the inductor current IL2 reaches zero being satisfied. Thereafter, the driving signal output circuit 220 outputs the driving signal Vq2 to turn on the NMOS transistor 26b, in response to the first condition being satisfied, the time period of a half of the switching period having elapsed after next occurrence of the rising edge of the driving signal Vq1, and a second condition that the inductor current IL2 reaches zero being satisfied.

<<<Operation of Switching Control Circuit 43c when the Load 11 Changes from Light Load State to Heavy Load State>>>

Figure 15:
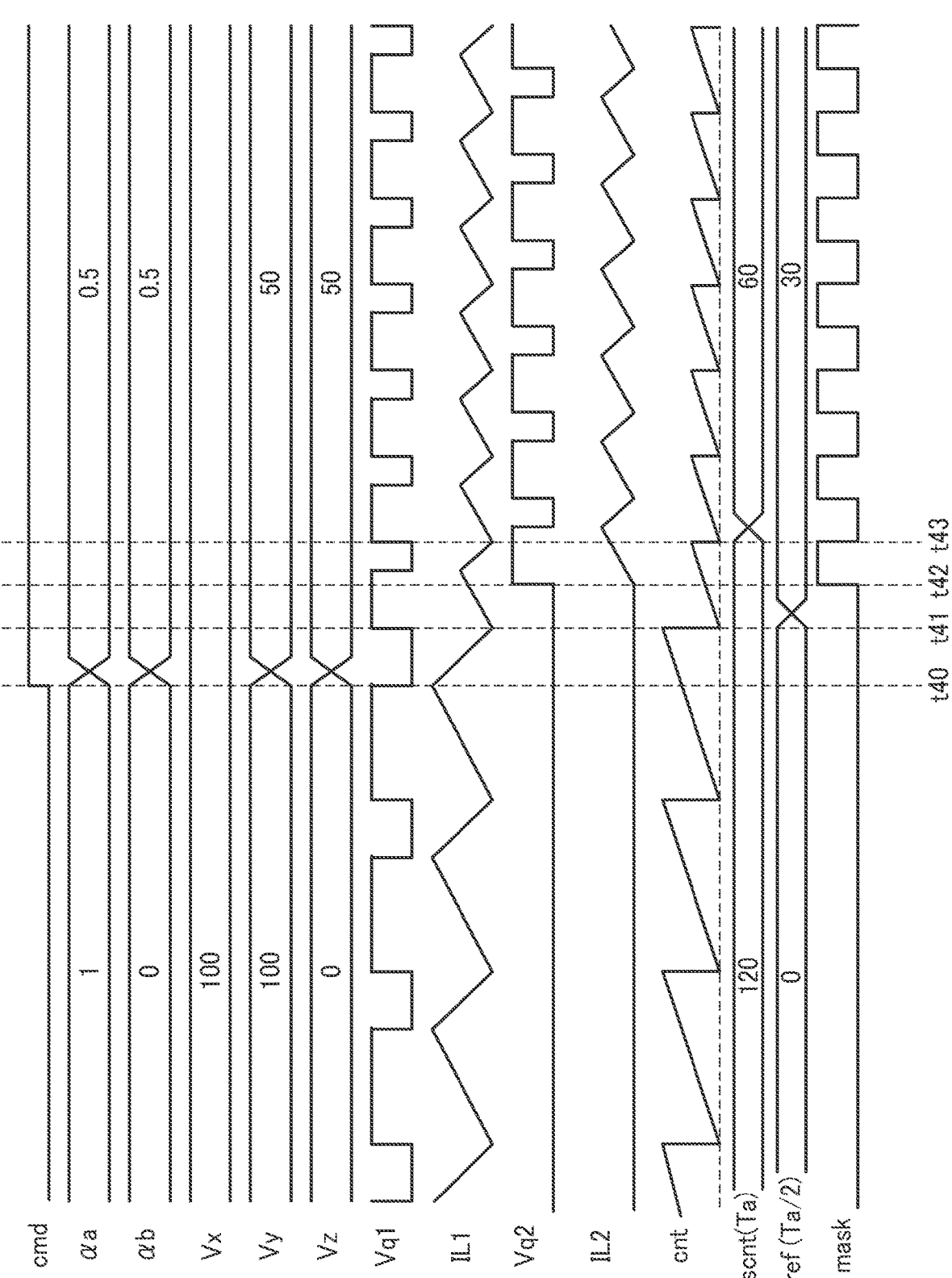
FIG. 15 is a diagram illustrating main waveforms of a switching control circuit 43c.

FIG. 15 is a diagram illustrating main waveforms of the switching control circuit 43c when the load 11 changes from the light load state to the heavy load state. It is assumed that before time t40, the load 11 is in the light load state, and thus the load detection circuit 12 outputs the low signal cmd, and the feedback voltage Vfb is such a voltage at which the voltage regulator circuit 104 outputs the ON period Vx of "100". Further, the multiplier circuit 110 outputs the ON period Vy of "100", and the multiplier circuit 112 outputs the ON period Vz of "0".

Further, before time t40, the switching control circuit 43c performs the operation as described with reference to FIG. 5. It is assumed that the switching period Ta of the NMOS transistor 26a is "120", and the sample-and-hold circuit 206 outputs the count value sont of "120". It is assumed that the switching period Ta of the NMOS transistor 26a is "120", and the sample-and-hold circuit 206 outputs the count value sont of "120". Further, since the load detection circuit 12 is outputting the low signal cmd, the multiplier circuit 208 is outputting the count value ref of "0".

At time t40, in response to the load detection circuit 12 detecting the load 11 has changed from the light load state to the heavy load state, the load detection circuit 12 outputs the high signal cmd. In response to the load detection circuit 12 outputting the high signal cmd, the ratio output circuit 106 outputs the ratio ab of "0.5". In response to the ratio αb of "0.5" being outputted, the subtractor circuit 108 outputs the ratio αa of "0.5". In response to the ratios αa, αb of "0.5" being outputted, the multiplier circuits 110, 112 output the ON periods Vy, Vz of "50", respectively.

At time t41, in response to the NMOS transistor 26a being turned on, the counter 204 outputs the count value cnt of "120", and the sample-and-hold circuit 206 continues to output the count value sont of "120". Since the NMOS transistor 26a is turned on first after the load detection circuit 12 outputs the high signal cmd, the multiplier circuit 208 outputs the count value ref of "30" obtained by multiplying the count value sent by "0.25".

At time t42 at which the counter 204 outputs the count value cnt that is the same as the count value ref, the detection circuit 200 outputs the high signal mask. In response to the detection circuit 200 outputting the high signal mask, the AND circuit 222 outputs the high signal Vc5, and the driving signal output circuit 220 outputs the driving signal Vq2 to turn on the NMOS transistor 26b, because the inductor current IL2 is zero.

At time t43 at which the inductor current IL1 reaches zero after the NMOS transistor 26a is turned off, the ON period Vy of the NMOS transistor 26a is a half of the ON period Vx, and thus the switching period Ta of the NMOS transistor 26a is "60". Thus, the sample-and-hold circuit 206 outputs the count value sont of "60". Further, since the NMOS transistor 26a is turned on at the second time after the load detection circuit 12 outputs the high signal cmd, the multiplier circuit 208 outputs the count value ref obtained by multiplying the count value sont by "0.5". Further, in response to the NMOS transistor 26a being turned on, the detection circuit 200 outputs the low signal mask.

Thereafter, the detection circuit 200 repeats outputting the high signal mask in response to the count value cnt matching the count value ref, and outputting the low signal mask in response to the NMOS transistor 26a being turned on. This ensures that the timing at which the NMOS transistor 26b is turned on is at or after the timing at which a half of the switching period Ta has elapsed since the NMOS transistor 26a is turned on. Then, the switching control circuit 43c can drive the NMOS transistors 26a, 26b such that the two boost chopper circuits perform the interleaved operations to some extent.

The operation of the switching control circuit 43c has been described above. Immediately after the load 11 enters the heavy load state, the switching control circuit 43c causes the two boost chopper circuits to operate the interleaved operation to some extent. However, due to variations in the circuit constants of the circuit elements configuring the AC-DC converter, changes in circuit constants due to temperature, and/or the like, the NMOS transistor 26c may not be driven in the critical mode in which the NMOS transistor 26b is turned on immediately after the inductor current IL2 reaches zero.

That is, in the above-described operation, depending on a condition, there may occur a waiting time from when the inductor current IL2 reaches zero until the NMOS transistor 26b is turned on. Thus, the above-mentioned phrase "the two boost chopper circuits perform the interleaved operation to some extent" means that in a strict sense, there may be a case in which the waveform of the inductor current IL2 includes a time period of zero current and the NMOS transistor 26b is driven in a discontinuous mode.

The following describes a switching control circuit 43d including an error output circuit 240 that controls the ON period of the NMOS transistor 26b based on the switching period Ta of the NMOS transistor 26a and the like such that the NMOS transistor 26b is also driven in the critical mode.

==Configuration of Switching Control Circuit 43d==

Figure 16:
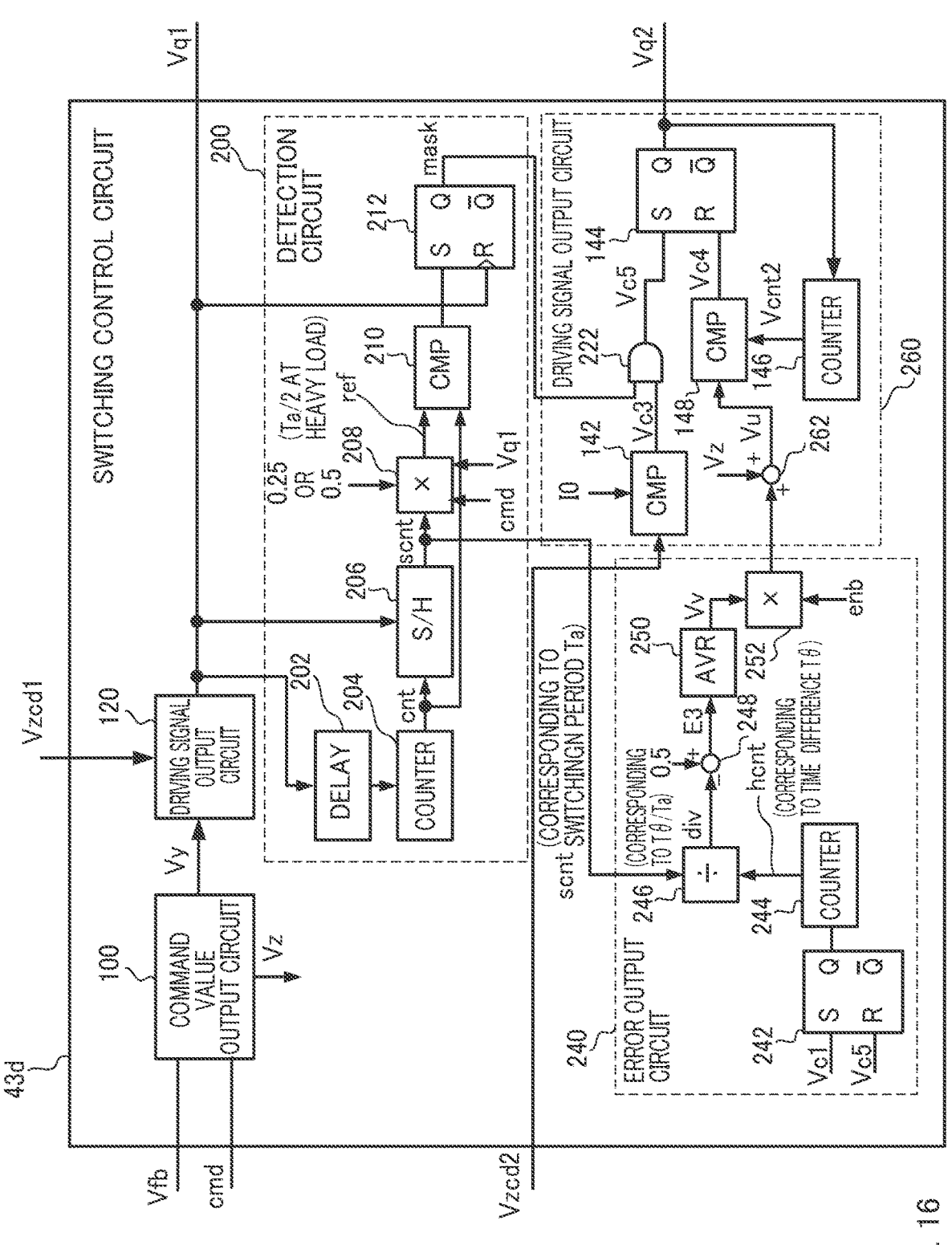
FIG. 16 is a diagram illustrating an example of a switching control circuit 43d.

FIG. 16 is a diagram illustrating an example of the switching control circuit 43d. The switching control circuit 43d outputs the driving signals Vq1, Vq2, based on the inductor currents IL1, IL2, the feedback voltage Vfb, and the signal cmd, as with the switching control circuits 43a, 43b, 43c. Specifically, the switching control circuit 43d outputs the driving signal Vq1 to turn on NMOS transistor 26a, in response to the inductor current IL1 reaching zero, and the voltage Vzcd1 that corresponds to the inductor current IL1 reaching the first predetermined voltage value, when the load 11 is in the heavy load state.

Thereafter, the switching control circuit 43d outputs the driving signal Vq2 to turn on the NMOS transistor 26b, when a half of the switching period Ta of the NMOS transistor 26a has elapsed, the inductor current IL2 reaches zero, and the voltage Vzcd2 corresponding to the inductor current IL2 reaches the second predetermined voltage value.

Further, the switching control circuit 43d drives the NMOS transistors 26a, 26b such that the interleaved operation is accurately performed, in response to the NMOS transistors 26b being turned on twice or more. The switching control circuit 43d includes the command value output circuit 100, the driving signal output circuit 120, a driving signal output circuit 260, the detection circuit 200, and the error output circuit 240.

===Error output circuit 240===

The error output circuit 240 outputs an ON period Vv to adjust the ON period Vu, which is the ON period of the NMOS transistor 26b, such that the two boost chopper circuits perform the interleaved operation based on the respective on-timings of the NMOS transistors 26a, 26b.

Specifically, the error output circuit 240 outputs the positive ON period Vv, in response to the on-timing of the NMOS transistor 26b advancing with respect to the on-timing of the NMOS transistor 26a. This causes a third ON period Vu to be longer than the ON period Vz, and the on-timing at which the NMOS transistor 26b is turned on later is delayed.

Meanwhile, the error output circuit 240 outputs the negative ON period Vv, in response to the on-timing of the NMOS transistor 26b being delayed with respect to the on-timing of the NMOS transistor 26a. This causes the third ON period Vu to be shorter than the ON period Vz, and the on-timing at which the NMOS transistor 26b is turned on later becomes earlier.

As described above, the principle of the error output circuit 240 is the same as that of the error output circuit 160. The error output circuit 240 includes an RS flip-flop circuit 242, a counter 244, a divider circuit 246, a subtractor circuit 248, a voltage regulator circuit 250, and a multiplier circuit 252.

Note that when the signal enb takes a value of "0", the ON period Vv results in "0", which will be described later in detail.

The RS flip-flop circuit 242 detects the time difference $T\theta$ between the on timings of the NMOS transistors 26a, 26b. Specifically, upon receiving the high signal Vc1, the RS flip-flop circuit 242 outputs a high signal Q, and upon receiving the high signal Vc5, the RS flip-flop circuit 242 outputs a low signal Q. Accordingly, the RS flip-flop circuit 242 detects the time difference TO in the time period in which the signal Q is high.

The counter 244 counts the time period during which the signal Q from the RS flip-flop circuit 242 is high, that is, the time difference TO, and in response to the signal Q going low, the counter 244 outputs the time difference TO as the count value hcnt.

The divider circuit 246 is a circuit to calculate a ratio R. Specifically, the divider circuit 246 divides the count value hcnt by the count value sent from the sample-and-hold circuit 206, that is, the switching period Ta of the NMOS transistor 26a, to thereby output the ratio R as a signal div.

The subtractor circuit 248 calculates the difference between the ratio R and the predetermined ratio (i.e., "0.5"), to thereby output a result as an error E3.

The voltage regulator circuit 250 outputs the ON period Vv for the switching control circuit 43d to implement the accurate interleaved operation, according to the error E3. Note the subtractor circuit 248 and the voltage regulator circuit 250 according to an embodiment of the present disclosure correspond to a so-called error amplifier circuit to perform amplification, integration, and the like of the error E3, for example.

When the signal enb is high, the multiplier circuit 252 multiplies the ON period Vv by "1", to thereby output a result as the ON period Vv, and when the signal enb is low, the multiplier circuit 252 multiplies the ON period Vv by "0", to thereby output a result as the ON period Vv. Note that the enable circuit (not illustrated) changes the signal enb to high, after the driving signal output circuit 260 outputs the driving signal Vq2 to turn on the NMOS transistor 26b twice or more, and changes the signal enb to low, in response to the load detection circuit 12 outputting the low signal cmd.

==Driving Signal Output Circuit 260==

The driving signal output circuit 260 outputs the driving signal Vq2 to drive the NMOS transistor 26b, based on the voltage Vzcd2 corresponding to the inductor current IL2, the ON periods Vz, Vv, and the signal mask. Specifically, the driving signal output circuit 260 outputs the driving signal Vq2 to turn on the NMOS transistor 26b, in response to the detection circuit 200 outputting the high signal mask, the inductor current IL2 reaching zero, the voltage Vzcd2 that corresponds to the inductor current IL2 reaching the second predetermined value. Thereafter, the driving signal output circuit 260 outputs the driving signal Vq2 to turn off the NMOS transistor 26b, in response to the ON period Vu according to the ON periods Vz and Vv having elapsed. The driving signal output circuit 260 includes the comparator circuits 142, 148, the RS flip-flop circuit 144, the counter 146, the AND circuit 222, and an adder circuit 262.

The adder circuit 262 adds the ON period Vz from the command value output circuit 100 and the ON period Vv from the error output circuit 240, to thereby output a result as the ON period Vu.

<<<Operation of Switching Control Circuit 43d when the Load 11 Changes from Light Load State to Heavy Load State>>>

Figure 17:
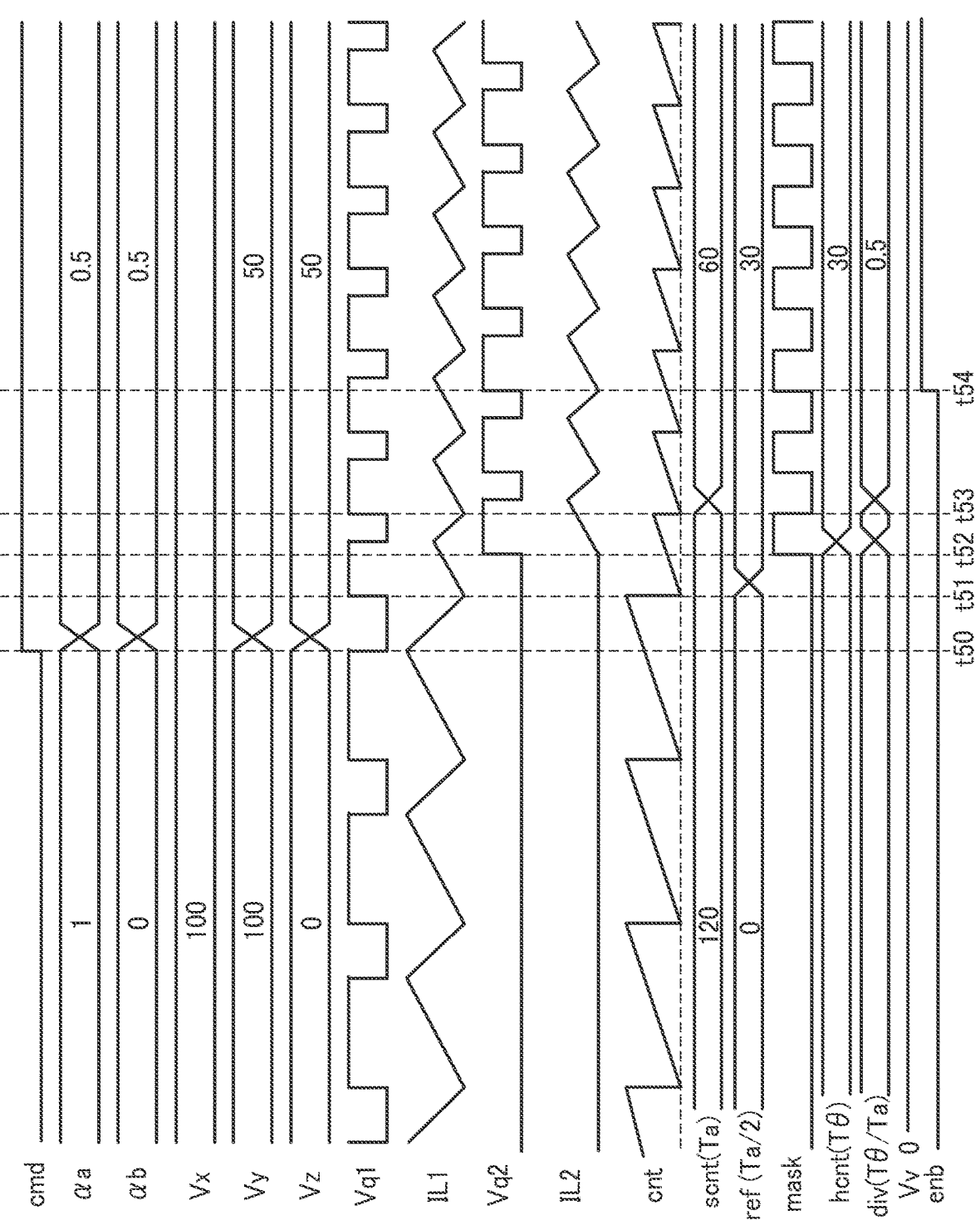
FIG. 17 is a diagram illustrating main waveforms of a switching control circuit 43d.

FIG. 17 is a diagram illustrating main waveforms of the switching control circuit 43d when the load 11 changes from the light load state to the heavy load state. It is assumed that before time t50, the load 11 is in the light load state, and thus the load detection circuit 12 outputs the low signal cmd, and the feedback voltage Vfb is such a voltage at which the voltage regulator circuit 104 outputs the ON period Vx of "100. Further, the multiplier circuit 110 outputs the ON period Vy of "100", and the multiplier circuit 112 outputs the ON period Vz of "0".

Further, before time t50, the switching control circuit 43d performs the operation as described with reference to FIG. 5. It is assumed that the switching period Ta of the NMOS transistor 26a is "120", and the sample-and-hold circuit 206 outputs the count value sont of "120". Further, since the load detection circuit 12 is outputting the low signal cmd, the multiplier circuit 208 is outputting the count value ref of "0".

At time t50, in response to the load detection circuit 12 detecting that the load 11 has changed from the light load state to the heavy load state, the load detection circuit 12 outputs the high signal cmd. In response to the load detection circuit 12 outputting the high signal cmd, the ratio output circuit 106 outputs the ratio ab of "0.5". In response to the ratio ab of "0.5" being outputted, the subtractor circuit 108 outputs the ratio $\alpha a$ of "0.5". In response to the ratios da, ab of "0.5" being outputted, the multiplier circuits 110, 112 output the ON periods Vy, Vz of "50", respectively.

At time t51, in response to the NMOS transistor 26a being turned on, the RS flip-flop circuit 242 outputs the high signal Q, and the counter 244 starts counting the time difference $T\theta$.

At time t52, in response to the NMOS transistor 26b being turned on, the RS flip-flop circuit 242 outputs the low signal Q, and the counter 244 outputs the count value hcnt of "30". Then, the divider circuit 246 outputs a signal div of "0.25", based on the count value hcnt of "30" and the count value sont of "120". However, the enable circuit is still outputting the low signal enb, and thus the ON period Vv remains "0".

At time t53, in response to the NMOS transistor 26a being turned on, the sample-and-hold circuit 206 outputs the count value sont of "60", and thus the divider circuit 246 outputs the signal div of "0.5", based on the count value hcnt of "30" and the count value sont of "60". Then, the voltage regulator circuit 250 outputs the ON period Vv of "0".

At time t54 after the NMOS transistor 26*b* is turned on twice or more, the enable circuit outputs the high signal enb, and the error output circuit 240 outputs the ON period Vv of "0".

Thereafter, the error output circuit 240 continues to output the ON period Vv based on the time difference TO and the switching period Ta. This enables the switching control circuit 43*d* to drive the NMOS transistors 26*a*, 26*b* such that the two boost chopper circuits accurately perform the interleaved operation.

<<<Simulation Results of Switching Control Circuit 43*d*>>>

Figure 18:
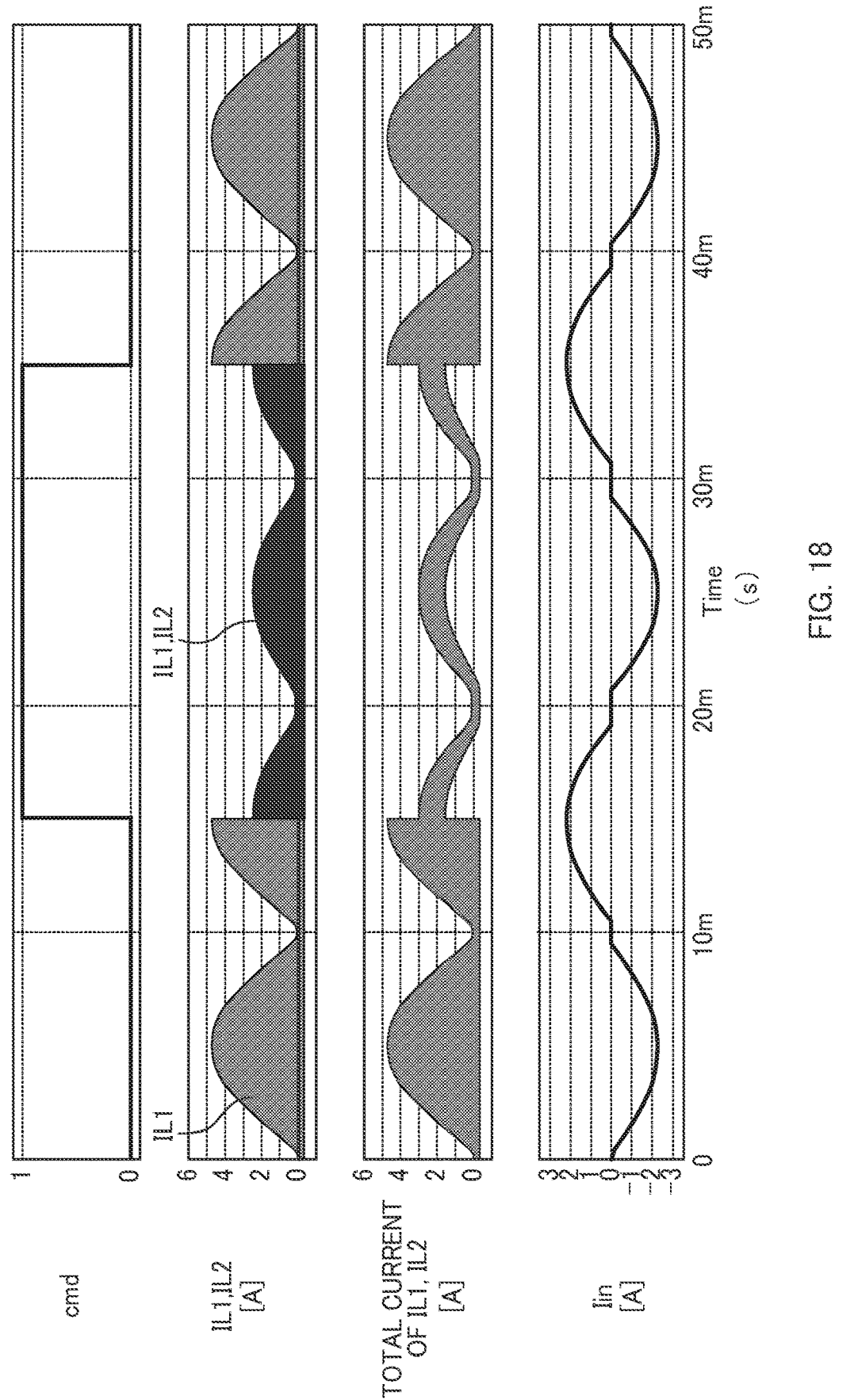
FIG. 18 is a diagram illustrating simulation results of a switching control circuit 43d.

FIG. 18 is a diagram illustrating simulation results of the switching control circuit 43*d*. Here, the top diagram illustrates the results indicating changes in the signal cmd. The second diagram from the top illustrates the results indicating the inductor currents IL1, IL2. The third diagram from the top illustrates the results indicating the total current of the inductor currents IL1, IL2. Furthermore, the bottom diagram illustrates the results indicating the input current Iin. Note that the simulation results in FIG. 18 are the same as the simulation results in FIG. 11, and thus the descriptions thereof are omitted.

<<<Enlarged View of Simulation Results of Switching Control Circuit 43*d*>>>

Figure 19:
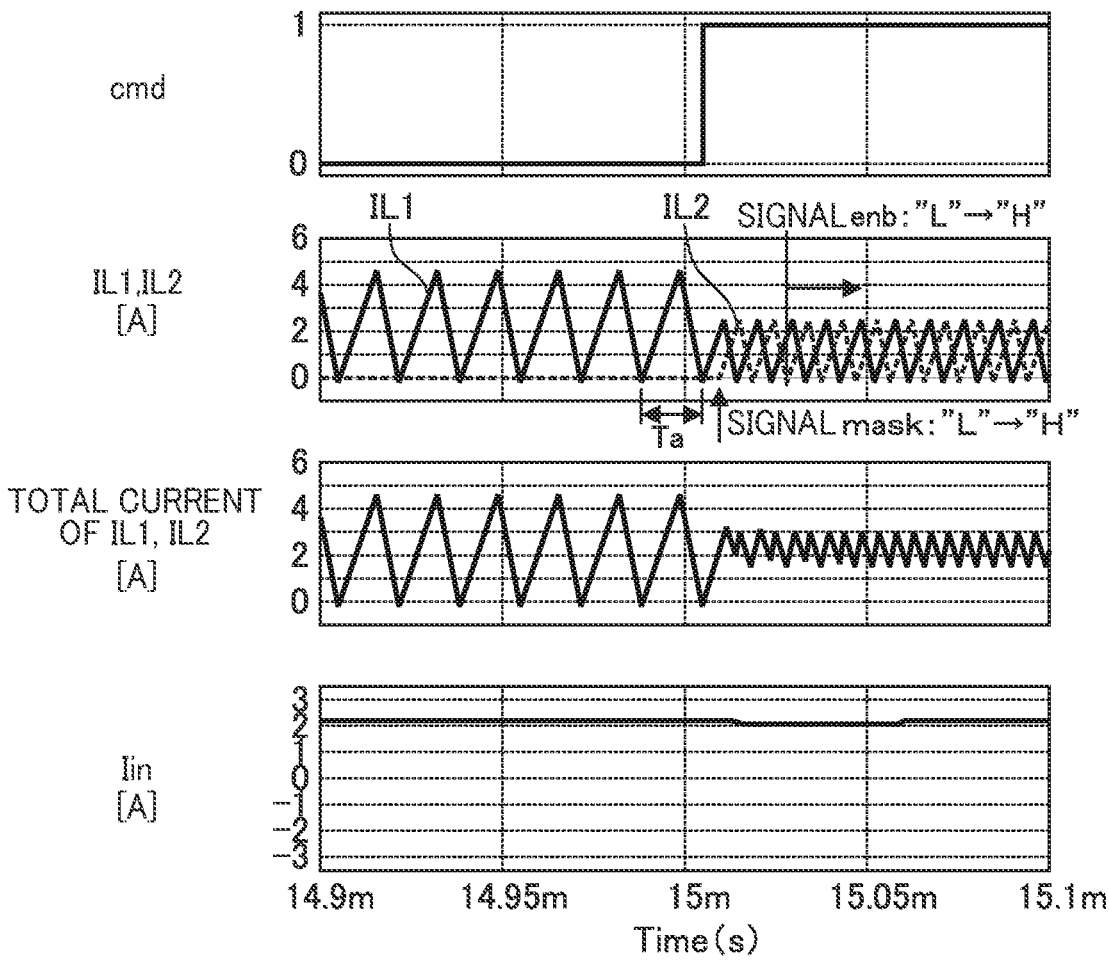
FIG. 19 is a diagram illustrating simulation results of a switching control circuit 43d.

FIG. 19 is an enlarged view of a portion corresponding to Time=14.9 to 15.1 ms of the simulation results of the switching control circuit 43*d* in FIG. 18. Further, the order in which the four simulation results are arranged is the same as that in FIG. 18, and thus the description thereof is omitted. Further, in FIGS. 19 and 20, the inductor current IL1 is given by the solid line, and the inductor current IL2 is given by the dashed line.

Around Time=15 ms, in response to the load detection circuit 12 outputting the high signal cmd, the command value output circuit 100 outputs the ON periods Vy, Vz of a half of the ON period Vx. Then, the driving signal output circuit 140 starts driving the NMOS transistor 26*b*, in response to a quarter of the switching period Ta having elapsed since the NMOS transistor 26*a* is turned on. The switching control circuit 43*d* drives the NMOS transistors 26*a*, 26*b* such that the two boost chopper circuits perform the interleaved operation, and thus the total current of the inductor currents IL1, IL2 has a waveform in which ripples are superimposed on low frequency components and the amplitude of the ripples are small. Note that since FIG. 19 is an enlarged view of a time period corresponding to Time=14.9 to 15.1 ms, and thus the input current Iin hardly changes.

Figure 20:
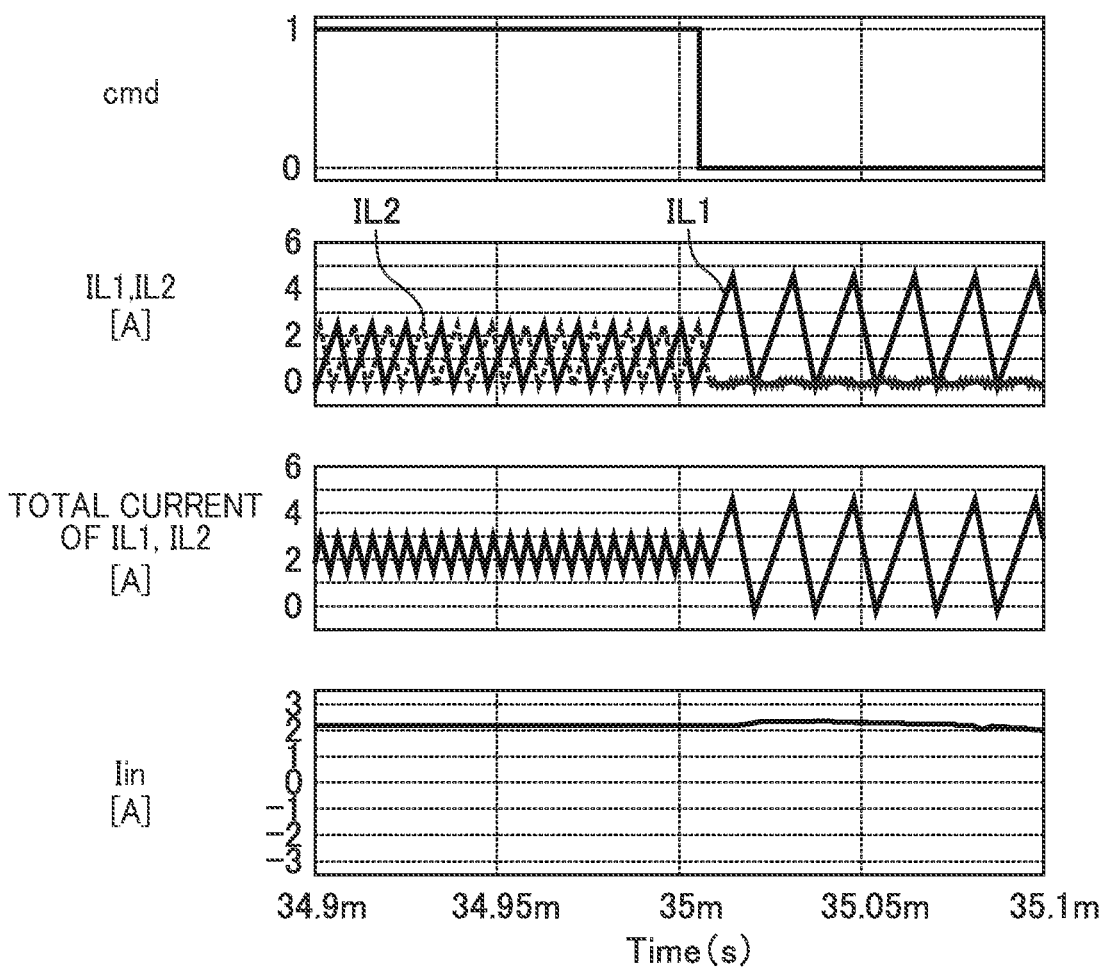
FIG. 20 is a diagram illustrating simulation results of a switching control circuit 43d.

FIG. 20 is an enlarged view of a portion corresponding to Time=34.9 to 35.1 ms of the simulation results of the switching control circuit 43*d* in FIG. 18. Furthermore, the order in which the four simulation results are arranged is the same as in FIG. 18, and thus the description thereof is omitted.

Around Time=35 ms, in response to the load detection circuit 12 outputting the low signal cmd, the command value output circuit 100 outputs the ON period Vy that is the ON period Vx, and the ON period Vz of "0". Then, the driving signal output circuit 260 stops driving the NMOS transistor 26*b*. In response to the driving of the NMOS transistor 26*b* being stopped, the total current of the inductor currents IL1, IL2 results in only the inductor current IL1. Note that FIG. 20 is an enlarged view of a time period corresponding to Time=34.9 to 35.1 ms in FIG. 18, and thus the input current Iin hardly changes.

A description has been given of an embodiment in which the load detection circuit 12 detects the state of the load 11 and the power factor correction IC 25 operates based on the signal cmd which is the detection result thereof. The method of detecting the state of the load 11 is not limited to the method of the load detection circuit 12, and as will be described below, the state of the load 11 may be detected inside the power factor correction IC 25.

<<<Overview of AC-DC Converter 13>>>

Figure 21:
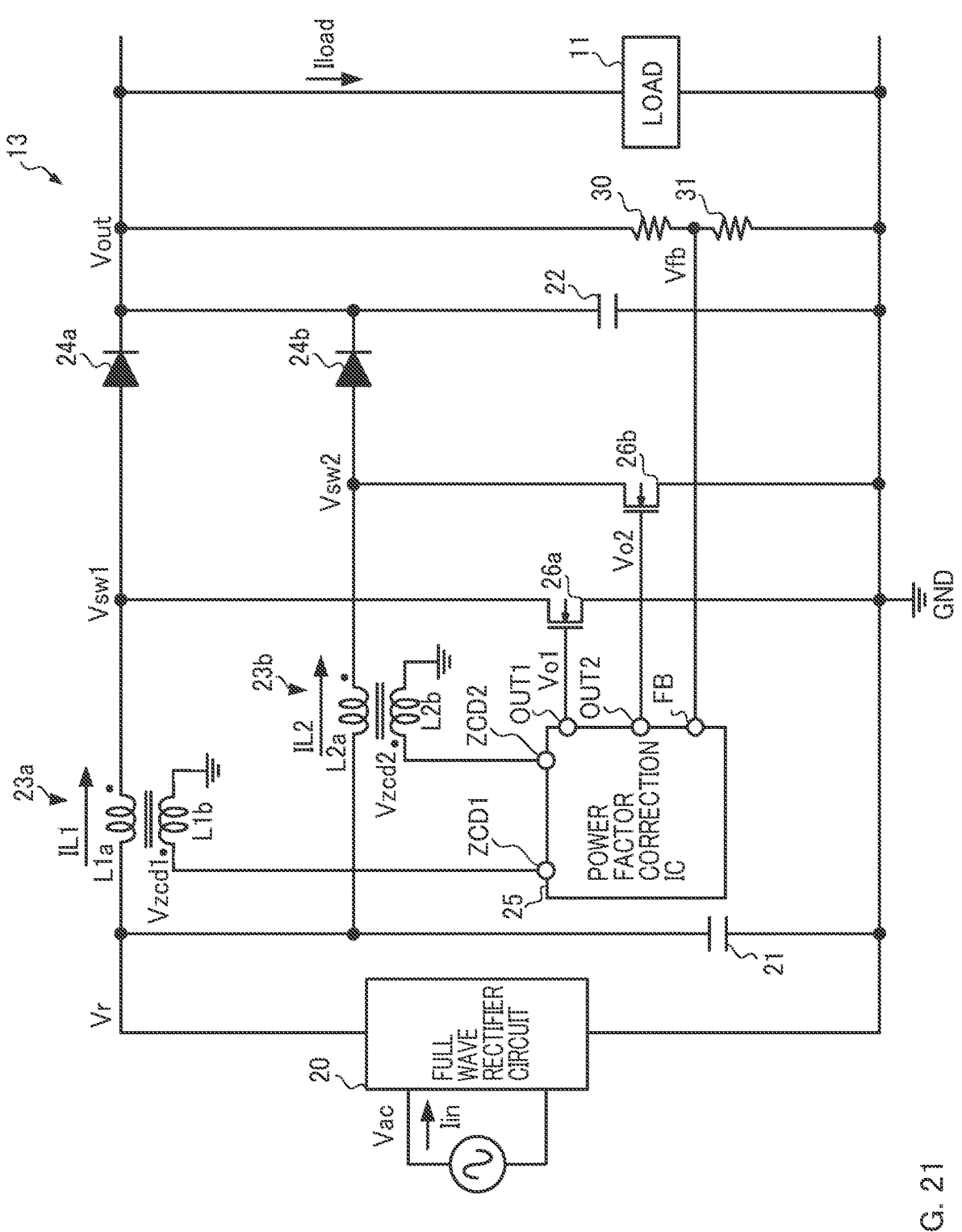
FIG. 21 is a diagram illustrating an example of an AC-DC converter 13.

FIG. 21 is a diagram illustrating a configuration of an AC-DC converter 13 which is an embodiment of the present disclosure. The AC-DC converter 13 is a boost power factor correction (PFC) circuit to generate the output voltage Vout at a target level from the AC voltage Vac of a commercial power supply, as with the AC-DC converter 10. The AC-DC converter 13 is different from the AC-DC converter 10 in that there is no load detection circuit 12 to detect the state of the load 11.

==Switching Control Circuit 43*e*==

Figure 22:
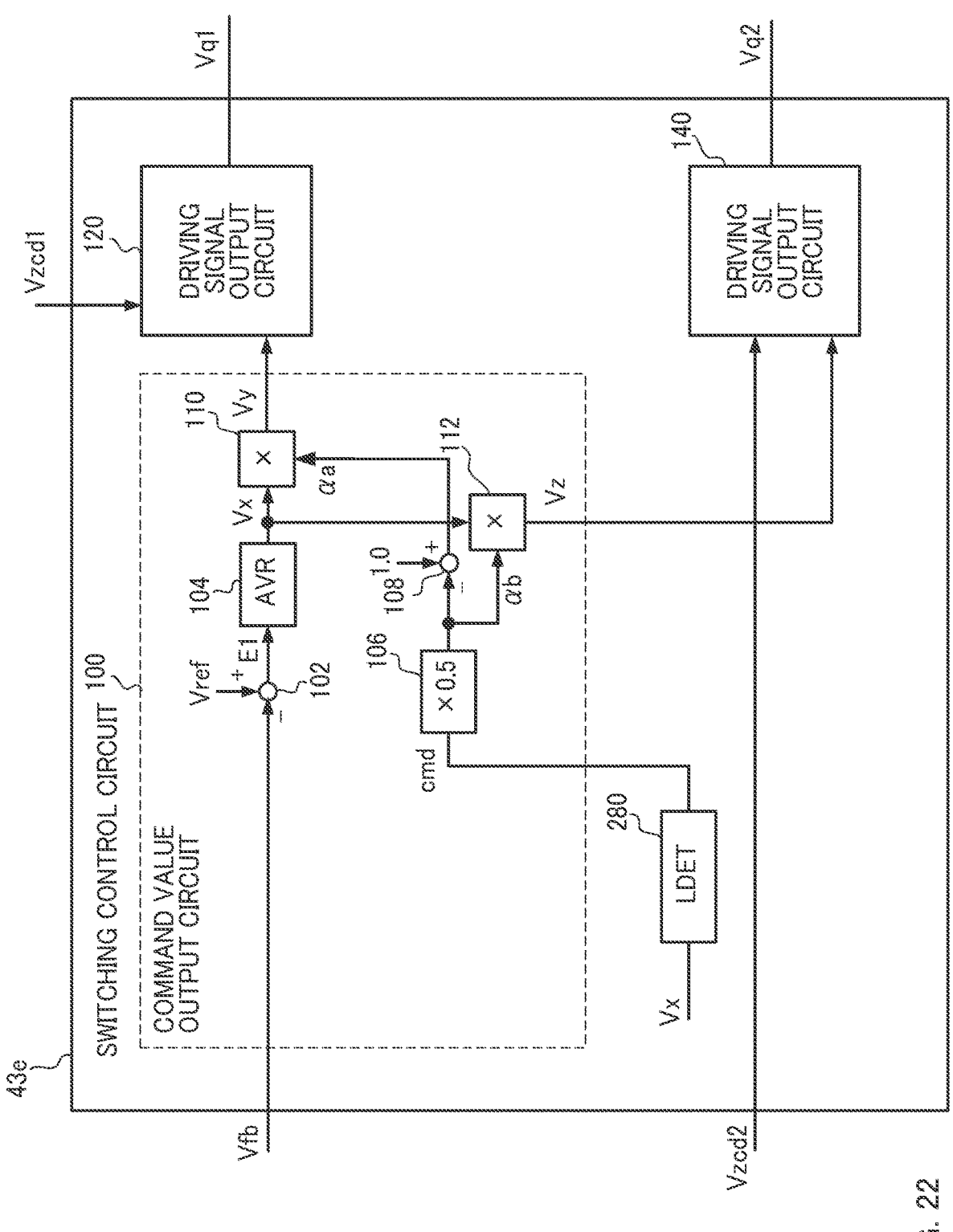
FIG. 22 is a diagram illustrating an example of a switching control circuit 43e.

FIG. 22 is an example of a switching control circuit 43*e*, which is an embodiment of the switching control circuit 43. The switching control circuit 43*e* is the same as the switching control circuit 43*a* except that the signal cmd is generated internally instead of being received from the load detection circuit 12. The switching control circuit 43*e* includes the command value output circuit 100, the driving signal output circuits 120, 140, and a load detection circuit 280.

===Load Detection Circuit 280===

The load detection circuit (LDET) 280 detects the state of the load 11 based on the ON period Vx. Specifically, in response to the ON period Vx decreasing below a third predetermined value corresponding to the first predetermined value, the load detection circuit 280 detects that the load 11 is in the light load state, to thereby output the low signal cmd, and in response to the ON period Vx exceeding a fourth predetermined value corresponding to the second predetermined value, the load detection circuit 280 detects that the load 11 is in the heavy load state, to thereby output the high signal cmd. Note that, as in the load detection circuit 12, the third predetermined value and the fourth predetermined value for detecting that the load 11 is in the light load state or the heavy load state may be the same or different.

Further, the principle on which the load detection circuit 280 is able to detect the state of the load 11 as such is as follows. In response to the load 11 entering the light load state, the output voltage Vout rising, and the feedback voltage Vfb rising, the ON period Vx decreases because the ON period of at least one of the NMOS transistor 26*a* or the NMOS transistor 26*b* is reduced so as to lower the output voltage Vout. Thus, the load detection circuit 280 can detect that the load 11 is the light load state in response to the ON period Vx decreasing below the third predetermined value.

Meanwhile, in response to the load 11 entering the heavy load state, the output voltage Vout dropping, and the feedback voltage Vfb dropping, the ON period Vx increases because the ON period of at least one of the NMOS transistor 26*a* or the NMOS transistor 26*b* is increased so as to raise the output voltage Vout. Thus, the load detection circuit 280 can detect that the load 11 is in the heavy load state in response to the ON period Vx exceeding the fourth predetermined value. Note that the load detection circuit 280 corresponds to a "second overcurrent detection circuit".

A description has been given of an embodiment in which the voltages Vzcd1, Vzcd2 are converted into digital values by the AD converters 40, 41, and then they are compared to the predetermined value I0, to thereby generate the signals Vc1 and Vc3 indicating the timing at which the NMOS transistors 26a, 26b are turned on.

In the case of such an embodiment, when the frequencies of the voltages Vzcd1, Vzcd2 are considered, the sampling frequency of the AC converter may result in being a high frequency, and the circuit scale of the AD converter may also result in being large. Thus, the following describes an embodiment using comparator circuits instead of the AD converters 40, 41.

<<<Example of Modification of Power Factor Correction IC 25>>>

Figure 23:
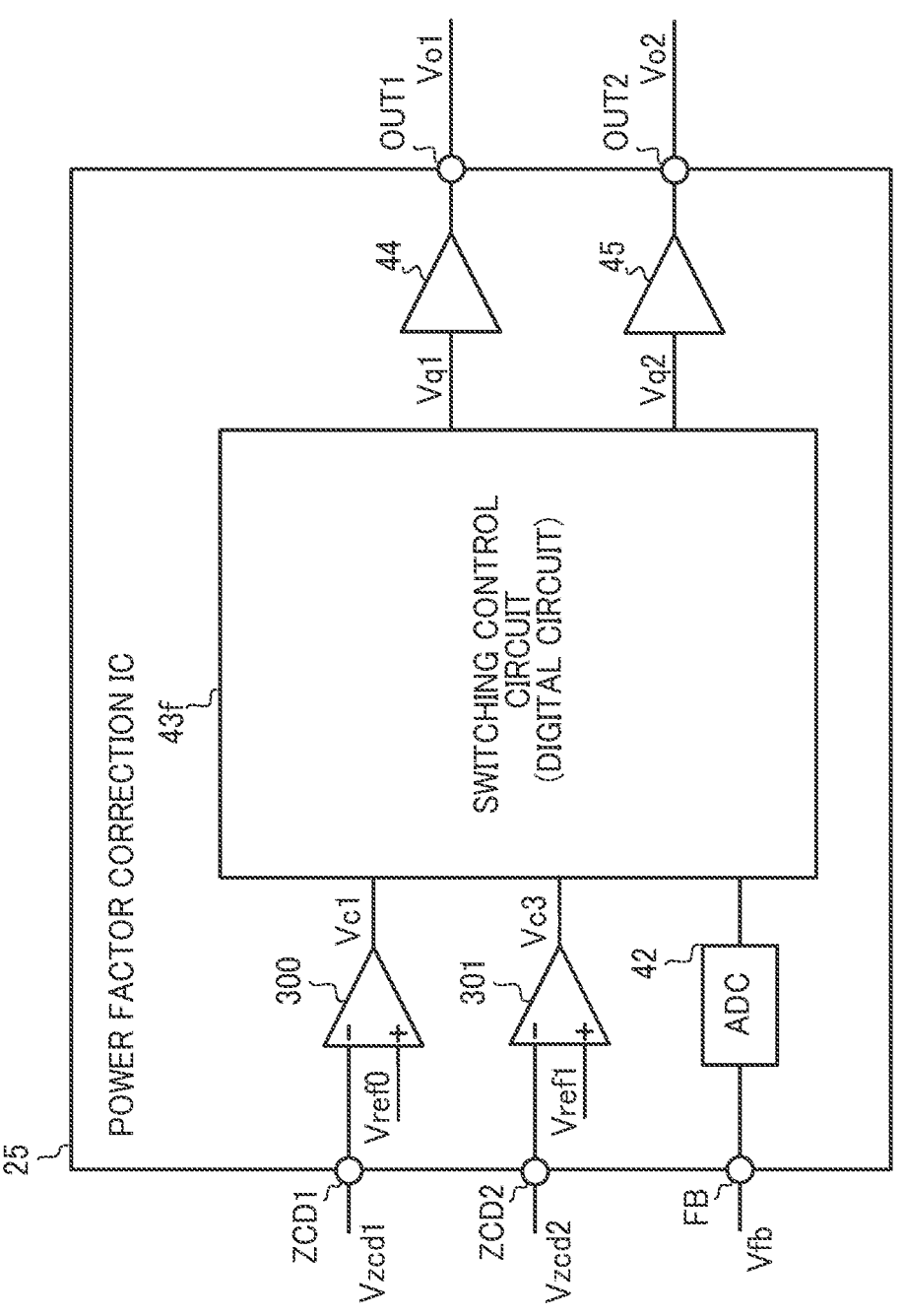
FIG. 23 is a diagram illustrating a modification example of a power factor correction IC 25.

FIG. 23 is a diagram illustrating an example of the power factor correction IC 25. In the power factor correction IC 25, the AD converter 40 in FIG. 2 converts the voltage Vzcd1 into a digital value, and then the comparator circuit 122 in FIG. 3 compares the voltage Vzcd1 with the digital value corresponding to the current value I0, to thereby output the signal Vc1. Similarly, the AD converter 41 in FIG. 2 converts the voltage Vzcd2 into a digital value, and then the comparator circuit 142 in FIG. 3 compares the voltage Vzcd2 with a digital value corresponding to the current value I1, to thereby output the signal Vc3.

Meanwhile, the modification example of the power factor correction IC 25 includes the comparator circuits 300, 301 that are analog circuits, instead of the AD converters 40, 41 in FIG. 2, a switching control circuit 43f, instead of the switching control circuit 43.

Further, the comparator circuit 300 compares the voltage Vzcd1 with a reference voltage Vref0 corresponding to the current value I0, to thereby output the high signal Vc1, in response to the voltage Vzcd1 dropping below the reference voltage Vref0. Further, the comparator circuit 300 outputs the low signal Vc1, in response to the voltage Vzcd1 exceeding the reference voltage Vref0.

Similarly, the comparator circuit 301 compares the voltage Vzcd2 with the reference voltage Vref1 corresponding to the current value I1, and the comparator circuit 301 outputs the high signal Vc3, in response to the voltage Vzcd2 dropping below the reference voltage Vref1. Further, the comparator circuit 301 outputs the low signal Vc3, in response to the voltage Vzcd2 exceeding the reference voltage Vref1.

The switching control circuit 43f operates, as with switching control circuit 43a, based on the signal Vc1 from the comparator circuit 300 and the signal Vc3 from the comparator circuit 301. As described above, in the modification example of the power factor correction IC 25, the AD converter 40 and the comparator circuit 122 of the power factor correction IC 25 are replaced with the comparator circuit 300, and the AD converter 41 and the comparator circuit 142 of the power factor correction IC 25 are replaced with the comparator circuit 301.

In the case of the power factor correction IC 25, the AD converters 40, 41 need a sampling interval to capture the instantaneous value of the switching waveform that reaches several 100 kHz at the maximum, and thus need the sampling frequency of at least several MHz. However, the power factor correction IC 25 being deformed as described above negates the need for the sampling frequency of several MHz, thereby being able to save the area of the power factor correction IC 25 and reduce the power consumption of the integrated circuit.

A description has been given of an embodiment in which the power factor correction IC 25 drives the NMOS transistors 26a, 26b. However, it is apparent that the NMOS transistors driven by the power factor correction IC 25 are not limited to two, and may be multiple (e.g., three or more). Further, those skilled in the art who have been exposed to the above described explanation would have easily conceived of a power factor correction IC that drives a plurality of NMOS transistors.

===Summary===

A description has been given of the AC-DC converter 10 according to an embodiment of the present disclosure. The switching control circuit 43a includes the command value output circuit 100, and the driving signal circuits 120, 140, and the buffer circuits 44, 45 drive the NMOS transistors 26a, 26b, in response to the driving signals Vq1, Vq2 from the driving signal output circuits 120, 140. The command value output circuit 100 is configured to, when the load 11 is in the light t load state, output only the ON period Vx corresponding to the output voltage Vout, and when the load 11 is in the heavy load state, the command value output circuit 100 outputs the ON periods Vy, Vz corresponding to the output voltage Vout. Further, the switching control circuit 43a drives both the NMOS transistors 26a, 26b with the ON period corresponding to the output voltage Vout so that the output voltage Vout does not fluctuate, when the current value of the load current Iload increases and the load 11 enters the heavy load state. This makes it possible to provide the switching control circuit that suppresses a disturbance of the input current caused by start of a parallel operation.

Further, the ON period Vy, Vz when the load 11 changes from the light load state to the heavy load state is shorter than the ON period Vx at a time when the load 11 is in the light load state immediately before changing. This enables the switching control circuit 43a to suppress a rise in the output voltage Vout and suppress a disturbance of the input current caused by control of a direct current voltage control system based on fluctuations of the output voltage Vout.

Further, when the load 11 enters the heavy load state, the command value output circuit 100 outputs the ON periods Vy, Vz equal to a half of the ON period Vx. This enables the switching control circuit 43a to suppress a rise in the output voltage, regardless of the magnitude of the current value of the load current Iload, even if the two boost chopper circuits perform a parallel operation.

The switching control circuit 43c includes the counter 204, and the driving signal output circuit 220 outputs the driving signal Vq2 to turn on the NMOS transistor 26b, in response to a quarter of the switching period Ta before the load 11 enters the heavy load state having elapsed and the inductor current IL2 reaching zero. This makes it possible that the switching control circuit 43c causes the two boost chopper circuit to perform the interleaved operation to some extent.

The driving signal output circuit 220 outputs the driving signal Vq2 to turn on the NMOS transistor 26b, in response to the load 11 entering the heavy load state, a half of the switching period Ta after the load 11 enters the heavy load state having elapsed after the NMOS transistor 26b is turned on once, and the inductor current IL2 reaching zero. This enables the switching control circuit 43c to turn on the NMOS transistor 26b in the vicinity of the middle of the switching period Ta after the load 11 changes from the light load state to the heavy load state.

The switching control circuits 43b, 43d include the error output circuits 160, 240, respectively. This makes it possible that the switching control circuits 43b, 43d cause the two boost chopper circuits to continue to accurately perform the interleaved operation, even if the circuit constants of the circuit elements change due to the heat generated by the operation of the AC-DC converter 10.

The AC-DC converter 10 includes the load detection circuit 12. This enables the switching control circuits 43a to 43d to determine the state of the load 11, based on the signal cmd from the load detection circuit 12.

The switching control circuit 43e includes the load detection circuit 280. This enables the switching control circuit 43e to determine the state of the load 11, based on the ON period Vx corresponding to the output voltage Vout.

The present disclosure is directed to provision of a switching control circuit that suppresses a disturbance of an input current caused by start of a parallel operation.

According to the present disclosure, it is possible to provide a switching control circuit that suppresses a disturbance of an input current caused by start of a parallel operation.

An embodiment of the present disclosure described above is simply to facilitate understanding of the present disclosure and is not in any way to be construed as limiting the present disclosure. The present disclosure may variously be changed or altered without departing from its essential features and encompass equivalents thereof.

What is claimed is:

1. A switching control circuit for a power supply circuit that generates an output voltage at a target level from an alternating current (AC) voltage inputted thereto, the power supply circuit including a first inductor and a second inductor, the first and second inductors being configured to receive a voltage corresponding to the AC voltage, a first transistor configured to control a first inductor current flowing through the first inductor, and a second transistor configured to control a second inductor current flowing through the second inductor, the switching control circuit being configured to control switching of the first transistor and the second transistor, the switching control circuit comprising:

a command value output circuit configured to, when a current value of a load current flowing through a load of the power supply circuit is smaller than a first predetermined value and the load is in a first state, output a first command value indicating a first time period corresponding to the output voltage, and when the current value of the load current is larger than a second predetermined value and the load is in a second state, output a second command value indicating a second time period corresponding to the output voltage, and a third command value indicating a third time period;

a first driver circuit configured to, when the load is in the first state, receive the first command value, turn on the first transistor, after the first inductor current reaches a first value, and turn off the first transistor, in response to the first time period based on the first command value having elapsed since the first transistor is turned on; and a second driver circuit configured to, when the load is in the second state, receive the third command value, turn on the second transistor, in response to the second inductor current reaching a second value, and

32 turn off the second transistor, in response to the third time period based on the third command value having elapsed since the second transistor is turned on, wherein the first driver circuit is further configured to, when the load is in the second state, receive the second command value, turn on the first transistor, in response to the first inductor current reaching the first value, and turn off the first transistor, in response to the second time period based on the second command value having elapsed since the first transistor is turned on.

2. The switching control circuit according to claim 1, wherein each of the second time period and the third time period is shorter than the first time period at a time before a state of the load changes to the second state.

3. The switching control circuit according to claim 2, further comprising a timer circuit configured to measure a switching period of the first transistor, wherein the second driver circuit is further configured to turn on the second transistor, in response to the state of the load changing to the second state, a time period corresponding to a quarter of the switching period of the first transistor having elapsed, and a first condition that the second inductor current reaches the second value being satisfied.

4. The switching control circuit according to claim 3, wherein the second driver circuit is further configured to turn on the second transistor, in response to a time period corresponding to a half of the switching period of the first transistor having elapsed after the first condition is satisfied, and a second condition that the second inductor current reaches the second value being satisfied.

5. The switching control circuit according to claim 1, wherein each of the second time period and the third time period is equal to a half of the first time period at a time before a state of the load changes to the second state.

6. The switching control circuit according to claim 1, further comprising an error output circuit configured to output an error between a predetermined ratio and a ratio between a switching period of the first transistor and a time difference between a first timing at which the first inductor current reaches the first value and a second timing at which the second inductor current reaches the second value, wherein the second driver circuit is further configured to, when the load is in the second state, turn on the second transistor, after the second inductor current reaches the second value, and turn off the second transistor, in response to a fourth time period according to the error and the third command value having elapsed.

7. The switching control circuit according to claim 1, wherein the power supply circuit further includes a first load detection circuit configured to detect a state of the load, and the command value output circuit outputs the first command value or the second and third command values, based on a result of detection of the first load detection circuit and the first command value indicating the first time period.

8. The switching control circuit according to claim 1, further comprising a second load detection circuit configured to detect a state of the load, based on the first command value indicating the first time period, wherein the command value output circuit outputs the first command value or the second and third command values, based on a result of detection of the second load detection circuit and the first command value indicating the first time period.

9. A power supply circuit configured to generate an output voltage at a target level from an alternating current (AC) voltage inputted thereto, the power supply circuit comprising:

a first inductor and a second conductor, the first and second inductors being configured to receive a voltage corresponding to the AC voltage;

a first transistor configured to control a first inductor current flowing through the first inductor;

a second transistor configured to control a second inductor current flowing through the second inductor;

a switching control circuit configured to control switching of the first transistor and the second transistor, the switching control circuit including a command value output circuit configured to, when a current value of a load current flowing through a load of the power supply circuit is smaller than a first predetermined value and the load is in a first state, output a first command value indicating a first time period corresponding to the output voltage, and when the current value of the load current is larger than a second predetermined value and the load is in a second state, output a second command value indicating a second time period corresponding to the output voltage, and a third command value indicating a third time period;

a first driver circuit configured to, when the load is in the first state, receive the first command value, turn on the first transistor, in response to the first inductor current reaching a first value, and turn off the first transistor, in response to the first time period based on the first command value having elapse since the first transistor is turned on; and a second driver circuit configured to, when the load is in the second state, receive the third command value, turn on the second transistor, after the second inductor current reaches a second value, and turn off the second transistor, in response to the third time period based on the third command value having elapsed since the second transistor is turned on, wherein the first driver circuit is further configured to, when the load is in the second state, receive the second command value, turn on the first transistor, in response to the first inductor current reaching the first value, and turn off the first transistor, in response to the second time period based on the second command value having elapsed since the first transistor is turned on.

* * * * *